United States Patent
Hareland et al.

(10) Patent No.: US 12,453,859 B2
(45) Date of Patent: Oct. 28, 2025

(54) POSTURE STATE DEFINITION CALIBRATION

(71) Applicant: Medtronic, Inc., Minneapolis, MN (US)

(72) Inventors: Scott A. Hareland, Lino Lakes, MN (US); Reid K. Bornhoft, Lino Lakes, MN (US)

(73) Assignee: Medtronic, Inc., Minneapolis, MN (US)

( * ) Notice: Subject to any disclaimer, the term of this patent is extended or adjusted under 35 U.S.C. 154(b) by 533 days.

(21) Appl. No.: 17/183,945

(22) Filed: Feb. 24, 2021

(65) Prior Publication Data

US 2022/0266025 A1 Aug. 25, 2022

(51) Int. Cl.
*A61N 1/36* (2006.01)
*A61B 5/11* (2006.01)
(Continued)

(52) U.S. Cl.
CPC ......... *A61N 1/36139* (2013.01); *A61N 1/025* (2013.01); *A61N 1/3604* (2017.08);
(Continued)

(58) Field of Classification Search
CPC .. A61N 1/36139; A61N 1/025; A61N 1/3604; A61N 1/37247; A61N 1/36062;
(Continued)

(56) References Cited

U.S. PATENT DOCUMENTS

| | | | |
|---|---|---|---|
| 4,297,685 A | 10/1981 | Brainard, II | |
| 4,365,633 A | 12/1982 | Loughman | |

(Continued)

FOREIGN PATENT DOCUMENTS

| | | |
|---|---|---|
| DE | 19831109 A1 | 1/2000 |
| DE | 10024103 A1 | 11/2001 |

(Continued)

OTHER PUBLICATIONS

"Analysis of heart rate dynamics by methods derived from non-linear mathematics: Clinical applicability and prognostic significance," retrieved from http://herkules.oulu.fi.isbn9514250133/html, on Feb. 9, 2004, 4 pp.

(Continued)

*Primary Examiner* — Carl H Layno
*Assistant Examiner* — Manolis Pahakis
(74) *Attorney, Agent, or Firm* — Shumaker & Sieffert, P.A.

(57) ABSTRACT

Devices, systems, and techniques for calibrating posture state definitions are described. In one example, a system includes a memory configured to store a plurality of posture state definitions defining a plurality of posture states. The system may also include processing circuitry configured to receive a request to update the plurality of posture state definitions, responsive to receiving the request, and obtain sensor data for one posture state of the plurality of posture states, wherein the sensor data generated while a patient is in the one posture state. The processing circuitry may also determine a difference between the sensor data and a posture state definition of the posture state definitions corresponding to the one posture state, update, based on the difference, the plurality of posture state definitions, and store the updated plurality of posture state definitions in the memory.

21 Claims, 12 Drawing Sheets

(51) Int. Cl.
*A61N 1/02* (2006.01)
*A61N 1/372* (2006.01)
*G16H 10/60* (2018.01)
*G16H 20/30* (2018.01)
*G16H 40/67* (2018.01)
*G16H 50/70* (2018.01)
*G16H 70/60* (2018.01)

(52) U.S. Cl.
CPC ......... *A61N 1/37247* (2013.01); *G16H 10/60* (2018.01); *G16H 20/30* (2018.01); *G16H 40/67* (2018.01); *G16H 50/70* (2018.01); *G16H 70/60* (2018.01); *A61B 5/1116* (2013.01); *A61B 5/1118* (2013.01); *A61N 1/36062* (2017.08)

(58) Field of Classification Search
CPC .... A61N 1/36071; G16H 10/60; G16H 20/30; G16H 40/67; G16H 50/70; G16H 70/60; G16H 15/00; G16H 20/17; G16H 40/40; G16H 40/63; A61B 5/1116; A61B 5/1118; A61B 5/686
See application file for complete search history.

(56) References Cited

U.S. PATENT DOCUMENTS

| | | | |
|---|---|---|---|
| 4,543,955 A | 10/1985 | Schroeppel | |
| 4,550,736 A | 11/1985 | Broughton et al. | |
| 4,566,456 A | 1/1986 | Koning et al. | |
| 4,771,780 A | 9/1988 | Sholder | |
| 4,776,345 A | 10/1988 | Cohen et al. | |
| 4,846,180 A | 7/1989 | Buffet | |
| 4,846,195 A | 7/1989 | Alt | |
| 5,031,618 A | 7/1991 | Mullett | |
| 5,040,534 A | 8/1991 | Mann et al. | |
| 5,040,536 A | 8/1991 | Riff | |
| 5,058,584 A | 10/1991 | Bourgeois | |
| 5,125,412 A | 6/1992 | Thornton | |
| 5,154,180 A | 10/1992 | Blanchet et al. | |
| 5,158,078 A | 10/1992 | Bennett et al. | |
| 5,167,229 A | 12/1992 | Peckham et al. | |
| 5,233,984 A | 8/1993 | Thompson | |
| 5,275,159 A | 1/1994 | Griebel | |
| 5,312,446 A | 5/1994 | Holschbach et al. | |
| 5,335,657 A | 8/1994 | Terry, Jr. et al. | |
| 5,337,758 A | 8/1994 | Moore et al. | |
| 5,342,409 A | 8/1994 | Mullett | |
| 5,354,317 A | 10/1994 | Alt | |
| 5,425,750 A | 6/1995 | Moberg | |
| 5,469,861 A | 11/1995 | Piscopo et al. | |
| 5,476,483 A | 12/1995 | Bomzin et al. | |
| 5,487,755 A | 1/1996 | Snell et al. | |
| 5,513,645 A | 5/1996 | Jacobson et al. | |
| 5,514,162 A | 5/1996 | Bomzin et al. | |
| 5,558,640 A | 9/1996 | Pfeiler et al. | |
| 5,562,707 A | 10/1996 | Prochazka et al. | |
| 5,593,431 A | 1/1997 | Sheldon | |
| 5,622,428 A | 4/1997 | Bonnet | |
| 5,628,317 A | 5/1997 | Starkebaum et al. | |
| 5,643,332 A | 7/1997 | Stein | |
| 5,645,053 A | 7/1997 | Remmers et al. | |
| 5,674,258 A | 10/1997 | Henschel et al. | |
| 5,711,316 A | 1/1998 | Elsberry et al. | |
| 5,720,770 A | 2/1998 | Nappholz et al. | |
| 5,732,696 A | 3/1998 | Rapoport et al. | |
| 5,741,310 A | 4/1998 | Wittkampf | |
| 5,782,884 A | 7/1998 | Stotts et al. | |
| 5,814,093 A | 9/1998 | Stein | |
| 5,832,932 A | 11/1998 | Elsberry et al. | |
| 5,833,709 A | 11/1998 | Rise et al. | |
| 5,833,713 A | 11/1998 | Moberg | |
| 5,836,989 A | 11/1998 | Shelton | |
| 5,851,193 A | 12/1998 | Arikka et al. | |
| 5,865,760 A | 2/1999 | Lidman et al. | |
| 5,885,471 A | 3/1999 | Ruben et al. | |
| 5,893,883 A | 4/1999 | Torgerson et al. | |
| 5,895,371 A | 4/1999 | Evitas et al. | |
| 5,904,708 A | 5/1999 | Goedeke | |
| 5,911,738 A | 6/1999 | Sikorski et al. | |
| 5,913,727 A | 6/1999 | Ahdoot | |
| 5,919,149 A | 7/1999 | Allum | |
| 5,938,690 A | 8/1999 | Law et al. | |
| 5,941,906 A | 8/1999 | Barreras, Sr. et al. | |
| 5,944,680 A | 8/1999 | Christopherson et al. | |
| 5,957,957 A | 9/1999 | Sheldon | |
| 6,027,456 A | 2/2000 | Feler et al. | |
| 6,044,297 A * | 3/2000 | Sheldon | A61B 5/686 |
| | | | 600/585 |
| 6,045,513 A | 4/2000 | Stone et al. | |
| 6,059,576 A | 5/2000 | Brann | |
| 6,083,475 A | 7/2000 | Shackle et al. | |
| 6,095,991 A | 8/2000 | Krausman et al. | |
| 6,099,479 A | 8/2000 | Christopherson et al. | |
| 6,102,874 A | 8/2000 | Stone et al. | |
| 6,120,467 A | 9/2000 | Schallhorn | |
| 6,128,534 A | 10/2000 | Park et al. | |
| 6,134,459 A | 10/2000 | Roberts et al. | |
| 6,157,857 A | 12/2000 | Dimpfel | |
| 6,165,143 A | 12/2000 | VanLummel | |
| 6,216,537 B1 | 4/2001 | Henschel et al. | |
| 6,259,948 B1 | 7/2001 | Florio et al. | |
| 6,280,409 B1 | 8/2001 | Stone et al. | |
| 6,296,606 B1 | 10/2001 | Goldberg et al. | |
| 6,308,098 B1 | 10/2001 | Meyer | |
| 6,308,099 B1 | 10/2001 | Fox et al. | |
| 6,315,740 B1 | 11/2001 | Singh | |
| 6,327,501 B1 | 12/2001 | Levine et al. | |
| 6,341,236 B1 | 1/2002 | Osorio et al. | |
| 6,351,672 B1 | 2/2002 | Park et al. | |
| 6,368,284 B1 | 4/2002 | Bardy | |
| 6,381,496 B1 | 4/2002 | Meadows et al. | |
| 6,393,325 B1 | 5/2002 | Mann et al. | |
| 6,438,408 B1 | 8/2002 | Mulligan et al. | |
| 6,440,090 B1 | 8/2002 | Schallhorn | |
| 6,449,508 B1 | 9/2002 | Sheldon et al. | |
| 6,459,934 B1 | 10/2002 | Kadhiresan | |
| 6,466,821 B1 | 10/2002 | Pianca et al. | |
| 6,468,234 B1 | 10/2002 | Van der Loos et al. | |
| 6,507,757 B1 | 1/2003 | Swain et al. | |
| 6,514,218 B2 | 2/2003 | Yamamoto | |
| 6,516,749 B1 | 2/2003 | Salasidis | |
| 6,539,249 B1 | 3/2003 | Kadhiresan et al. | |
| 6,547,755 B1 | 4/2003 | Lippe et al. | |
| 6,572,557 B2 | 6/2003 | Tchou et al. | |
| 6,574,507 B1 | 6/2003 | Bonnet | |
| 6,605,038 B1 | 8/2003 | Teller et al. | |
| 6,609,031 B1 | 8/2003 | Law et al. | |
| 6,611,783 B2 | 8/2003 | Kelly, Jr. et al. | |
| 6,620,151 B2 | 9/2003 | Blischak et al. | |
| 6,625,493 B2 | 9/2003 | Kroll et al. | |
| 6,635,048 B1 | 10/2003 | Ullestad et al. | |
| 6,641,542 B2 | 11/2003 | Cho et al. | |
| 6,658,292 B2 | 12/2003 | Kroll et al. | |
| 6,659,968 B1 | 12/2003 | McClure | |
| 6,662,047 B2 | 12/2003 | Sorensen | |
| 6,665,558 B2 | 12/2003 | Kalgren et al. | |
| 6,668,188 B2 | 12/2003 | Sun et al. | |
| 6,687,538 B1 | 2/2004 | Hrdlicka et al. | |
| 6,731,984 B2 | 5/2004 | Cho et al. | |
| 6,740,075 B2 | 5/2004 | Lebel et al. | |
| 6,748,276 B1 | 6/2004 | Daignault, Jr. et al. | |
| 6,752,766 B2 | 6/2004 | Kowallik et al. | |
| 6,773,404 B2 | 8/2004 | Poezevera et al. | |
| 6,782,315 B2 | 8/2004 | Lu et al. | |
| 6,817,979 B2 | 11/2004 | Nihtila | |
| 6,820,025 B2 | 11/2004 | Bachmann et al. | |
| 6,829,507 B1 | 12/2004 | Lidman et al. | |
| 6,832,113 B2 | 12/2004 | Belalcazar | |
| 6,834,436 B2 | 12/2004 | Townsend | |
| 6,853,863 B2 | 2/2005 | Carter et al. | |
| 6,878,121 B2 | 4/2005 | Krausman et al. | |
| 6,884,596 B2 | 4/2005 | Civelli et al. | |

(56) References Cited

U.S. PATENT DOCUMENTS

| | | |
|---|---|---|
| 6,890,306 B2 | 5/2005 | Poezevera |
| 6,895,341 B2 | 5/2005 | Barrey et al. |
| 6,922,587 B2 | 7/2005 | Weinberg |
| 6,923,784 B2 | 8/2005 | Stein |
| 6,928,324 B2 | 8/2005 | Park et al. |
| 6,937,899 B2 | 8/2005 | Sheldon et al. |
| 6,937,900 B1 | 8/2005 | Pianca et al. |
| 6,945,934 B2 | 9/2005 | Bardy |
| 6,964,641 B2 | 11/2005 | Cho et al. |
| 6,975,904 B1 | 12/2005 | Sloman |
| 6,997,882 B1 * | 2/2006 | Parker .................... A61B 5/08 600/595 |
| 6,999,817 B2 | 2/2006 | Park et al. |
| 7,016,730 B2 | 3/2006 | Ternes |
| 7,031,772 B2 | 4/2006 | Condie |
| 7,043,305 B2 | 5/2006 | KenKnight et al. |
| 7,054,687 B1 | 5/2006 | Andersen |
| 7,066,910 B2 | 6/2006 | Bauhahn et al. |
| 7,082,333 B1 | 7/2006 | Bauhahn |
| 7,092,759 B2 | 8/2006 | Nehls et al. |
| 7,095,424 B2 | 8/2006 | Satoh et al. |
| 7,110,820 B2 | 9/2006 | Tcheng et al. |
| 7,117,036 B2 | 10/2006 | Florio |
| 7,123,967 B2 | 10/2006 | Weinberg |
| 7,130,681 B2 | 10/2006 | Gebhardt et al. |
| 7,130,689 B1 | 10/2006 | Turcott |
| 7,141,026 B2 | 11/2006 | Aminian et al. |
| 7,142,921 B2 | 11/2006 | Mattes et al. |
| 7,149,579 B1 | 12/2006 | Koh et al. |
| 7,149,584 B1 | 12/2006 | Koh et al. |
| 7,151,961 B1 | 12/2006 | Whitehurst et al. |
| 7,155,279 B2 | 12/2006 | Whitehurst et al. |
| 7,160,252 B2 | 1/2007 | Cho et al. |
| 7,162,304 B1 | 1/2007 | Bradley |
| 7,167,743 B2 | 1/2007 | Heruth et al. |
| 7,167,751 B1 | 1/2007 | Whitehurst et al. |
| 7,181,281 B1 | 2/2007 | Kroll |
| 7,189,204 B2 | 3/2007 | Ni et al. |
| 7,207,947 B2 | 4/2007 | Koh et al. |
| 7,210,240 B2 | 5/2007 | Townsend et al. |
| 7,212,862 B2 | 5/2007 | Park et al. |
| 7,214,197 B2 | 5/2007 | Prass |
| 7,218,964 B2 | 5/2007 | Hill et al. |
| 7,218,968 B2 | 5/2007 | Condie et al. |
| 7,221,979 B2 | 5/2007 | Zhou et al. |
| 7,231,254 B2 | 6/2007 | DiLorenzo |
| 7,242,983 B2 | 7/2007 | Frei et al. |
| 7,252,640 B2 | 8/2007 | Ni et al. |
| 7,266,412 B2 | 9/2007 | Stypulkowski |
| 7,308,311 B2 | 12/2007 | Sorensen et al. |
| 7,313,440 B2 | 12/2007 | Miesel |
| 7,317,948 B1 | 1/2008 | King et al. |
| 7,330,760 B2 | 2/2008 | Heruth et al. |
| 7,366,569 B2 | 4/2008 | Belalcazar |
| 7,366,572 B2 | 4/2008 | Heruth et al. |
| 7,387,610 B2 | 6/2008 | Stahmann |
| 7,389,147 B2 | 6/2008 | Wahlstrand et al. |
| 7,395,113 B2 | 7/2008 | Heruth |
| 7,403,820 B2 | 7/2008 | DiLorenzo |
| 7,406,351 B2 | 7/2008 | Wesselink |
| 7,415,308 B2 | 8/2008 | Gerber et al. |
| 7,447,545 B2 | 11/2008 | Heruth et al. |
| 7,471,290 B2 | 12/2008 | Wang et al. |
| 7,471,980 B2 | 12/2008 | Koshiol |
| 7,489,970 B2 | 2/2009 | Lee et al. |
| 7,491,181 B2 | 2/2009 | Heruth et al. |
| 7,505,815 B2 | 3/2009 | Lee et al. |
| 7,519,431 B2 | 4/2009 | Goetz et al. |
| 7,542,803 B2 | 6/2009 | Heruth et al. |
| 7,548,786 B2 | 6/2009 | Lee et al. |
| 7,559,901 B2 | 7/2009 | Maile |
| 7,572,225 B2 | 8/2009 | Stahmann et al. |
| 7,577,479 B2 | 8/2009 | Hartley et al. |
| 7,580,752 B2 | 8/2009 | Gerber et al. |
| 7,584,808 B2 | 9/2009 | Dolgin et al. |
| 7,590,453 B2 | 9/2009 | Heruth |
| 7,590,455 B2 | 9/2009 | Heruth et al. |
| 7,590,481 B2 | 9/2009 | Lu et al. |
| 7,591,265 B2 | 9/2009 | Lee et al. |
| 7,603,170 B2 | 10/2009 | Hatlestad et al. |
| 7,623,919 B2 | 11/2009 | Goetz et al. |
| 7,634,379 B2 | 12/2009 | Noble |
| 7,664,546 B2 | 2/2010 | Hartley et al. |
| 7,672,806 B2 | 3/2010 | Tronconi |
| 7,717,848 B2 | 5/2010 | Heruth et al. |
| 7,769,464 B2 | 8/2010 | Gerber et al. |
| 7,792,583 B2 | 9/2010 | Heruth et al. |
| 8,032,229 B2 | 10/2011 | Gerber et al. |
| 8,150,531 B2 | 4/2012 | Skelton |
| 8,175,720 B2 | 5/2012 | Skelton et al. |
| 8,200,340 B2 | 6/2012 | Skelton et al. |
| 8,209,028 B2 * | 6/2012 | Skelton ................ A61B 5/1116 607/46 |
| 8,219,206 B2 | 7/2012 | Skelton et al. |
| 8,231,555 B2 | 7/2012 | Skelton et al. |
| 8,231,556 B2 | 7/2012 | Skelton et al. |
| 8,249,718 B2 | 8/2012 | Skelton et al. |
| 8,280,517 B2 | 10/2012 | Skelton et al. |
| 8,282,580 B2 | 10/2012 | Skelton et al. |
| 8,315,710 B2 | 11/2012 | Skelton et al. |
| 8,323,218 B2 | 12/2012 | Davis et al. |
| 8,326,420 B2 | 12/2012 | Skelton et al. |
| 8,332,041 B2 | 12/2012 | Skelton et al. |
| 8,388,555 B2 | 3/2013 | Panken et al. |
| 8,401,666 B2 | 3/2013 | Skelton et al. |
| 8,437,861 B2 | 5/2013 | Skelton et al. |
| 8,447,411 B2 | 5/2013 | Skelton et al. |
| 8,515,549 B2 | 8/2013 | Panken et al. |
| 8,515,550 B2 | 8/2013 | Skelton et al. |
| 8,583,252 B2 | 11/2013 | Skelton et al. |
| 8,644,945 B2 | 2/2014 | Skelton et al. |
| 8,688,225 B2 | 4/2014 | Panken et al. |
| 8,708,934 B2 | 4/2014 | Skelton et al. |
| 8,751,011 B2 | 6/2014 | Skelton et al. |
| 8,755,901 B2 | 6/2014 | Skelton et al. |
| 8,758,274 B2 | 6/2014 | Sahasrabudhe et al. |
| 8,886,302 B2 | 11/2014 | Skelton et al. |
| 8,958,885 B2 | 2/2015 | Panken et al. |
| 9,026,223 B2 | 5/2015 | Skelton et al. |
| 9,050,471 B2 | 6/2015 | Skelton et al. |
| 9,149,210 B2 | 10/2015 | Sahasrabudhe et al. |
| 9,327,070 B2 | 5/2016 | Skelton et al. |
| 9,327,129 B2 | 5/2016 | Panken |
| 9,440,084 B2 | 9/2016 | Davis et al. |
| 9,545,518 B2 | 1/2017 | Panken et al. |
| 9,566,441 B2 | 2/2017 | Skelton |
| 9,592,387 B2 | 3/2017 | Skelton et al. |
| 9,662,045 B2 | 5/2017 | Skelton et al. |
| 9,776,008 B2 | 10/2017 | Skelton et al. |
| 9,956,412 B2 | 5/2018 | Skelton et al. |
| 9,968,784 B2 | 5/2018 | Skelton et al. |
| 2002/0038137 A1 | 3/2002 | Stein |
| 2002/0091308 A1 | 7/2002 | Kipshidze et al. |
| 2002/0107553 A1 | 8/2002 | Hill et al. |
| 2002/0115939 A1 | 8/2002 | Mulligan et al. |
| 2002/0165586 A1 | 11/2002 | Hill et al. |
| 2002/0169485 A1 | 11/2002 | Pless et al. |
| 2002/0170193 A1 | 11/2002 | Townsend et al. |
| 2003/0004423 A1 | 1/2003 | Lavie et al. |
| 2003/0036783 A1 | 2/2003 | Bauhahn et al. |
| 2003/0045910 A1 | 3/2003 | Sorensen et al. |
| 2003/0065370 A1 | 4/2003 | Lebel et al. |
| 2003/0088185 A1 | 5/2003 | Prass |
| 2003/0149457 A1 | 8/2003 | Tcheng et al. |
| 2003/0171791 A1 | 9/2003 | KenKnight et al. |
| 2003/0181960 A1 | 9/2003 | Carter et al. |
| 2003/0204211 A1 | 10/2003 | Condie et al. |
| 2004/0015103 A1 | 1/2004 | Aminian et al. |
| 2004/0049132 A1 | 3/2004 | Barron et al. |
| 2004/0088020 A1 | 5/2004 | Condie et al. |
| 2004/0102814 A1 | 5/2004 | Sorensen et al. |
| 2004/0133248 A1 | 7/2004 | Frei et al. |
| 2004/0138716 A1 | 7/2004 | Kon et al. |
| 2004/0147975 A1 | 7/2004 | Popovic et al. |

(56) References Cited

U.S. PATENT DOCUMENTS

| | | |
|---|---|---|
| 2004/0199215 A1 | 10/2004 | Lee et al. |
| 2004/0199216 A1 | 10/2004 | Lee et al. |
| 2004/0199217 A1 | 10/2004 | Lee et al. |
| 2004/0199218 A1 | 10/2004 | Lee et al. |
| 2004/0215286 A1 | 10/2004 | Stypulkowski |
| 2004/0220621 A1 | 11/2004 | Zhou et al. |
| 2004/0225332 A1 | 11/2004 | Gebhardt et al. |
| 2004/0257693 A1 | 12/2004 | Ehrlich |
| 2005/0042589 A1 | 2/2005 | Hatlestad et al. |
| 2005/0043767 A1 | 2/2005 | Belalcazar |
| 2005/0060001 A1 | 3/2005 | Singhal et al. |
| 2005/0061320 A1 | 3/2005 | Lee et al. |
| 2005/0113710 A1 | 5/2005 | Stahmann et al. |
| 2005/0113887 A1 | 5/2005 | Bauhahn |
| 2005/0126026 A1 | 6/2005 | Townsend et al. |
| 2005/0137627 A1 | 6/2005 | Koshiol et al. |
| 2005/0145246 A1 | 7/2005 | Hartley et al. |
| 2005/0172311 A1 | 8/2005 | Hjelt et al. |
| 2005/0177192 A1 | 8/2005 | Rezai et al. |
| 2005/0209511 A1 | 9/2005 | Heruth et al. |
| 2005/0209512 A1 | 9/2005 | Heruth et al. |
| 2005/0209513 A1 | 9/2005 | Heruth et al. |
| 2005/0209643 A1 | 9/2005 | Heruth et al. |
| 2005/0209644 A1 | 9/2005 | Heruth et al. |
| 2005/0209645 A1 | 9/2005 | Heruth et al. |
| 2005/0215847 A1 | 9/2005 | Heruth et al. |
| 2005/0215947 A1 | 9/2005 | Heruth et al. |
| 2005/0216064 A1 | 9/2005 | Heruth et al. |
| 2005/0222522 A1 | 10/2005 | Heruth et al. |
| 2005/0222638 A1 | 10/2005 | Foley et al. |
| 2005/0228455 A1 | 10/2005 | Kramer et al. |
| 2005/0234514 A1 | 10/2005 | Heruth et al. |
| 2005/0234518 A1 | 10/2005 | Heruth et al. |
| 2005/0240242 A1 | 10/2005 | DiLorenzo |
| 2005/0245988 A1 | 11/2005 | Miesel |
| 2005/0283210 A1 | 12/2005 | Blischak et al. |
| 2006/0190049 A1 | 8/2006 | Gerber et al. |
| 2006/0190050 A1 | 8/2006 | Gerber et al. |
| 2006/0190051 A1 | 8/2006 | Gerber et al. |
| 2006/0195051 A1 | 8/2006 | Schnapp et al. |
| 2006/0206167 A1 | 9/2006 | Flaherty et al. |
| 2006/0212080 A1 | 9/2006 | Hartley et al. |
| 2006/0213267 A1 | 9/2006 | Tronconi et al. |
| 2006/0235289 A1 | 10/2006 | Wesselink et al. |
| 2006/0235472 A1 | 10/2006 | Goetz et al. |
| 2006/0241513 A1* | 10/2006 | Hatlestad ............ A61N 1/36521 600/547 |
| 2006/0247732 A1 | 11/2006 | Wesselink |
| 2006/0247739 A1 | 11/2006 | Wahlstrand et al. |
| 2006/0259099 A1 | 11/2006 | Goetz et al. |
| 2006/0262120 A1 | 11/2006 | Rosenberg |
| 2006/0265025 A1 | 11/2006 | Goetz et al. |
| 2006/0287686 A1 | 12/2006 | Cullen et al. |
| 2007/0015976 A1 | 1/2007 | Miesel et al. |
| 2007/0038265 A1 | 2/2007 | Tcheng et al. |
| 2007/0050715 A1 | 3/2007 | Behar |
| 2007/0073355 A1 | 3/2007 | DiLorenzo et al. |
| 2007/0115277 A1 | 5/2007 | Wang et al. |
| 2007/0118056 A1 | 5/2007 | Wang et al. |
| 2007/0123758 A1 | 5/2007 | Miesel et al. |
| 2007/0129622 A1 | 6/2007 | Bourget et al. |
| 2007/0129641 A1 | 6/2007 | Sweeney |
| 2007/0129769 A1 | 6/2007 | Bourget et al. |
| 2007/0129774 A1 | 6/2007 | Bourget et al. |
| 2007/0150026 A1* | 6/2007 | Bourget ............ A61N 1/37252 607/46 |
| 2007/0150029 A1* | 6/2007 | Bourget ............ A61N 1/37252 607/62 |
| 2007/0213789 A1 | 9/2007 | Nolan et al. |
| 2007/0249968 A1 | 10/2007 | Miesel et al. |
| 2007/0250121 A1 | 10/2007 | Miesel et al. |
| 2007/0250134 A1 | 10/2007 | Miesel et al. |
| 2007/0255118 A1 | 11/2007 | Miesel et al. |
| 2007/0255154 A1 | 11/2007 | Lu et al. |
| 2007/0265664 A1 | 11/2007 | Gerber et al. |
| 2007/0265681 A1 | 11/2007 | Gerber et al. |
| 2007/0276439 A1 | 11/2007 | Miesel et al. |
| 2007/0293917 A1 | 12/2007 | Thompson |
| 2008/0071150 A1 | 3/2008 | Miesel et al. |
| 2008/0071324 A1 | 3/2008 | Miesel et al. |
| 2008/0071326 A1 | 3/2008 | Heruth et al. |
| 2008/0071327 A1 | 3/2008 | Miesel et al. |
| 2008/0079444 A1 | 4/2008 | Denison |
| 2008/0081958 A1 | 4/2008 | Denison et al. |
| 2008/0114219 A1 | 5/2008 | Zhang et al. |
| 2008/0164979 A1 | 7/2008 | Otto |
| 2008/0177355 A1 | 7/2008 | Miesel et al. |
| 2008/0188901 A1 | 8/2008 | Sanghera et al. |
| 2008/0188909 A1 | 8/2008 | Bradley |
| 2008/0194998 A1 | 8/2008 | Holmstrom et al. |
| 2008/0204255 A1 | 8/2008 | Flexer et al. |
| 2008/0262361 A1* | 10/2008 | Gutfinger ............ A61B 5/053 600/486 |
| 2008/0269812 A1 | 10/2008 | Gerber et al. |
| 2008/0269843 A1 | 10/2008 | Gerber |
| 2008/0281376 A1 | 11/2008 | Gerber et al. |
| 2008/0288200 A1 | 11/2008 | Noble |
| 2008/0300449 A1 | 12/2008 | Gerber et al. |
| 2008/0300470 A1 | 12/2008 | Gerber et al. |
| 2009/0030263 A1 | 1/2009 | Heruth et al. |
| 2009/0036951 A1 | 2/2009 | Heruth et al. |
| 2009/0046056 A1 | 2/2009 | Rosenberg et al. |
| 2009/0076343 A1 | 3/2009 | Kristofer et al. |
| 2009/0082829 A1 | 3/2009 | Panken et al. |
| 2009/0099627 A1 | 4/2009 | Molnar et al. |
| 2009/0105785 A1 | 4/2009 | Wei et al. |
| 2009/0118599 A1 | 5/2009 | Heruth et al. |
| 2009/0228841 A1 | 9/2009 | Hildreth |
| 2009/0233770 A1 | 9/2009 | Vincent et al. |
| 2009/0259216 A1 | 10/2009 | Drew et al. |
| 2009/0264789 A1 | 10/2009 | Molnar et al. |
| 2009/0270747 A1* | 10/2009 | van Dam ............ A61B 5/1116 600/595 |
| 2009/0306740 A1 | 12/2009 | Heruth et al. |
| 2009/0324024 A1* | 12/2009 | Worthington ........ G06V 40/161 382/118 |
| 2010/0010380 A1 | 1/2010 | Panken et al. |
| 2010/0010381 A1 | 1/2010 | Skelton et al. |
| 2010/0010382 A1 | 1/2010 | Panken et al. |
| 2010/0010383 A1* | 1/2010 | Skelton ............ A61N 1/36132 600/587 |
| 2010/0010384 A1 | 1/2010 | Panken et al. |
| 2010/0010385 A1 | 1/2010 | Skelton et al. |
| 2010/0010386 A1 | 1/2010 | Skelton et al. |
| 2010/0010387 A1 | 1/2010 | Skelton et al. |
| 2010/0010388 A1 | 1/2010 | Panken et al. |
| 2010/0010389 A1 | 1/2010 | Davis et al. |
| 2010/0010390 A1 | 1/2010 | Skelton et al. |
| 2010/0010391 A1 | 1/2010 | Skelton et al. |
| 2010/0010392 A1 | 1/2010 | Skelton et al. |
| 2010/0010432 A1 | 1/2010 | Skelton et al. |
| 2010/0010571 A1 | 1/2010 | Skelton et al. |
| 2010/0010572 A1 | 1/2010 | Skelton et al. |
| 2010/0010573 A1 | 1/2010 | Skelton et al. |
| 2010/0010574 A1* | 1/2010 | Skelton .................. G16H 40/67 607/59 |
| 2010/0010575 A1 | 1/2010 | Skelton et al. |
| 2010/0010576 A1 | 1/2010 | Skelton et al. |
| 2010/0010577 A1 | 1/2010 | Skelton et al. |
| 2010/0010578 A1 | 1/2010 | Skelton et al. |
| 2010/0010579 A1 | 1/2010 | Skelton et al. |
| 2010/0010580 A1 | 1/2010 | Skelton et al. |
| 2010/0010583 A1 | 1/2010 | Panken et al. |
| 2010/0010584 A1 | 1/2010 | Skelton et al. |
| 2010/0010585 A1* | 1/2010 | Davis .................. A61N 1/36132 607/62 |
| 2010/0010586 A1 | 1/2010 | Skelton et al. |
| 2010/0010587 A1 | 1/2010 | Skelton et al. |
| 2010/0010588 A1 | 1/2010 | Skelton et al. |
| 2010/0010589 A1 | 1/2010 | Skelton et al. |
| 2010/0010590 A1 | 1/2010 | Skelton et al. |
| 2010/0030286 A1 | 2/2010 | Goetz et al. |
| 2010/0121415 A1 | 5/2010 | Skelton et al. |
| 2010/0174155 A1 | 7/2010 | Heruth et al. |

(56) References Cited

U.S. PATENT DOCUMENTS

| | | | | |
|---|---|---|---|---|
| 2011/0009754 | A1* | 1/2011 | Wenzel | B82Y 40/00 600/485 |
| 2011/0172564 | A1* | 7/2011 | Drew | A61B 5/061 600/587 |
| 2011/0172738 | A1* | 7/2011 | Davis | G16H 40/67 607/59 |
| 2012/0108915 | A1* | 5/2012 | Corbucci | A61N 1/36535 600/301 |
| 2014/0257050 | A1* | 9/2014 | Kuroda | A61B 5/7221 600/301 |
| 2014/0313030 | A1* | 10/2014 | Ten Kate | G08B 21/0438 340/539.12 |
| 2021/0236829 | A1* | 8/2021 | Zhang | A61B 5/388 |
| 2021/0350931 | A1* | 11/2021 | Dawoud | A61B 5/0031 |

FOREIGN PATENT DOCUMENTS

| | | |
|---|---|---|
| EP | 0564803 A1 | 10/1993 |
| EP | 0845240 A1 | 6/1998 |
| EP | 0849715 A2 | 6/1998 |
| EP | 1195139 A1 | 4/2002 |
| EP | 1291036 A2 | 3/2003 |
| EP | 1308182 A2 | 5/2003 |
| EP | 1391846 A1 | 2/2004 |
| EP | 1437159 A1 | 7/2004 |
| EP | 1731088 A1 | 12/2006 |
| EP | 1870128 A1 | 12/2007 |
| EP | 1938862 A2 | 7/2008 |
| GB | 2330912 A | 5/1999 |
| GB | 2408342 A | 5/2005 |
| GB | 2447647 A | 9/2008 |
| WO | 9405371 A1 | 3/1994 |
| WO | 9629007 A1 | 9/1996 |
| WO | 9704705 A1 | 2/1997 |
| WO | 9749455 A1 | 12/1997 |
| WO | 9800197 A1 | 1/1998 |
| WO | 9956820 A1 | 11/1999 |
| WO | 0137930 A1 | 5/2001 |
| WO | 0228282 A1 | 4/2002 |
| WO | 0241771 A1 | 5/2002 |
| WO | 0287433 A1 | 11/2002 |
| WO | 0296512 A1 | 12/2002 |
| WO | 02100267 A1 | 12/2002 |
| WO | 0351356 A1 | 6/2003 |
| WO | 0365891 A2 | 8/2003 |
| WO | 0528029 A2 | 3/2005 |
| WO | 0535050 A1 | 4/2005 |
| WO | 0579487 A2 | 9/2005 |
| WO | 0589646 A1 | 9/2005 |
| WO | 0589647 A1 | 9/2005 |
| WO | 0589860 A1 | 9/2005 |
| WO | 05102499 A1 | 11/2005 |
| WO | 05120348 A1 | 12/2005 |
| WO | 0709088 A2 | 1/2007 |
| WO | 0751196 A2 | 5/2007 |
| WO | 0764682 A1 | 6/2007 |
| WO | 0764936 A1 | 6/2007 |
| WO | 0826970 A1 | 3/2008 |

OTHER PUBLICATIONS

"Design Competition: Runners-Up for the Best Three Designs," EPN, vol. 26, No. 1, Jan. 2002, 1 pg.

"IBM and Citizen Watch develop Linux-Based WatchPad," retrieved from http:/wwwlinuxdevices.com/news/NS6580187845.html, on Feb. 20, 2006 5 pp.

"MiniMitter® Physiological and Behavioral Monitoring for Humans and Animals," retrieved from http://www.minimitter.com/Products/Actiwatch, on Feb. 20, 2006 3 pp.

"Watch," retrieved from Wikipedia,http://en.wikipedia.org/wiki/Watch, on Feb. 20, 2006, 6 pp.

Aminian et al., "Physical Activity Monitoring Based on Accelerometry: Validation and Comparison with Video Observation," Medical & Biological Engineering and Computing, vol. 37, No. 2, May 1999, pp. 304-308.

Amzica, "Physiology of Sleep and Wakefulness as it Relates to the Physiology of Epilepsy," Journal of Clinical Neurophysiology, American Clinical Neurophysiology Society, vol. 19, No. 6, Dec. 2002, pp. 488-503.

Ang et al., "Physical model of a MEMS accelerometer for low-g motion tracking applications," 2004 IEEE International Conference on Robotics and Automation, vol. 2, Apr. 2004, pp. 1345-1351.

Buchser et al., "Improved Physical Activity in Patients Treated for Chronic Pain by Spinal Cord Stimulation," Neuromodulation, vol. 8, Issue 1, pp. 40-48, Mar. 2005.

Crago et al., "An Elbow Extension Neuroprosthesis for Individuals with Tetraplegia," IEEE Transactions on Rehabilitation Engineering, vol. 6, No. 1, pp. 1-6, Mar. 1998.

Dejnabadi et al., "Estimation and Visualization of Sagittal Kinematics ofLower Limbs Orientation Using Body-Fixed Sensors," IEEE Transactions on Biomedical Engineering, vol. 53, No. 7, pp. 1385-1393, Jul. 2006.

Dinner, "Effect of Sleep on Epilepsy," Journal of Clinical Neurophysiology, American Clinical Neurophysiology Society, vol. 19 No. 6, Dec. 2002, pp. 504-513.

Foerster et al., "Motion Pattern and Posture: Correctly Assessed by Calibrated Accelerometers," Forschungsgrupe Psychophysiologie, UniversWit Freiburg, Germany, Mar. 2000, 28 pp.

Foldvary-Schaefer, "Sleep Complaints and Epilepsy: The Role of Seizures, Antiepileptic Drugs and Sleep Disorders," Journal of Clinical Neurophysiology, American Clinical Neurophysiology Society, vol. 19 No. 6, Dec. 2002, pp. 514-521.

Fourcade et al., "Modeling Phase Transitions in Human Posture," Studies in Perception and Action VII, Sheena Rogers & Judith Effken (eds), Lawrence Erlbaum Associated, Inc., pp. 99-103, Jul. 13-18, 2003.

Giansanti et al., "The development and test of a device for the reconstruction of 3-D position and orientation by means of a kinematic sensor assembly with rate gyroscopes and accelerometers," IEEE Transactions on Biomedical Engineering, v. 52, No. 7, pp. 1271-1277, Jul. 2005.

Goodrich et al., "The Prediction of Pain Using Measures of Sleep Quality," 1998 (Applicant points out, in accordance with MPEP 609.04(a), that the year of publication, 1998, is sufficiently earlier than the effective U.S. filing date, so that the particular month of publication is not in issue.) Pain Digest, vol. 8, pp. 23-25.

Heinz et al., "Using Wearable Sensors for Real-time Recognition Tasks in Games of Martial Arts—an Initial Experiment," Institute for Computer Systems and Networks (CSN), UMIT—University of Health Systems, Medical Informatics and Technology Hall in Tyrol, Austria, http://leis.comp.lanes.ac.uk/fileadmin/relate/publication/2006-WearableSensors.pdf2006 (Applicant points out, in accordance with MPEP 609.04(a), that the year of publication, 2006, is sufficiently earlier than the effective U.S. filing date, so that the particular month of publication is not in issue.).

Hendelman et al., "Validity of Accelerometry for the Assessment of Moderate Intensity Physical Activity in the Field," Medicine & Science in Sports & Exercise, Sep. 2000, pp. S442-S449.

Hinckley et al., "Sensing Techniques for Mobile Interaction," ACM UIST 2000 Symposium on User Interface Software & Technology, CHI Letters vol. 2 No. 2, Nov. 2000, pp. 91-100.

Husak, "Model of Tilt Sensor Systems," ICECS 2002, 9th IEEE International Conference on Electronics, Circuits and Systems, vol. 1, 2002 (Applicant points out, in accordance with MPEP 609.04(a), that the year of publication, 2002, is sufficiently earlier than the effective U.S. filing date, so that the particular month of publication is not in issue.) pp. 227-230.

Karantonis et al., "Implementation of a Real-Time Human Movement Classifier Using a Triaxial Accelerometer for Ambulatory Monitoring," IEEE Transactions on Information Technology in Biomedicine, vol. 10, No. 1, Jan. 2006, pp. 156-167.

Kassam, "2005 EDP Topic "MK4": Tremor Data-Logger for Parkinson's Disease Patients," Retrieved from http://www.ee.ryerson.ca/~-courses/edp2005/MK4.html, on Feb. 20, 2006, 3 pp.

(56) References Cited

OTHER PUBLICATIONS

Kerr et al., "Analysis of the sit-stand-sit movement cycle in normal subjects," Clinical Biomechanics, vol. 12, No. 4, Jun. 1997, pp. 236-245.

Kiani et al., "Computerized Analysis of Daily Life Motor Activity for Ambulatory Monitoring," Technology and Health Care 5, Oct. 1997, pp. 307-318.

Kitchin et al., "Compensating for the 0 g Offset Drift of the ADXL50 Accelerometer," Analog Devices Application Note AN-380, May 1994, 2 pp.

Lau, "Strategies for Generating Prolonged Functional Standing Using Intramuscular Stimulation or Intraspinal Microstimulation," IEEE Transactions on Neural Systems and Rehabilitation Engineering, vol. 15, No. 2, Jun. 2007, pp. 273-285.

Leiper et al., "Sensory Feedback for Head Control in Cerebral Palsy," Physical Therapy, vol. 61, No. 4, pp. 512-518, Apr. 1981.

Lorussi, "Wearable, Redundant Fabric-Based Sensor Arrays for Reconstruction of Body Segment Posture," IEEE Sensors Journal, vol. 4, No. 6, Dec. 2004, pp. 808-817.

Mathie et al., "A Pilot Study of Long-Term Monitoring of Human Movements in the Home Using Accelerometer," Journal of Telemedicine and Telecare10, Jun. 2007, pp. 144-151.

Mathie et al., "Determining Activity Using a Triaxial Accelerometer," Proceedings of the Second Joint EMBS/BMES Conference, Houston, TX, Oct. 23-26, 2002, pp. 2481-2482.

Mattmann et al., "Recognizing Upper Body Postures Using Textile Strain Sensors," Proceedings Eleventh IEEE International Symposium on Wearable Computers, ISWC, Oct. 11-13, 2007, pp. 29-36.

Mendez et al., "Interactions Between Sleep and Epilepsy," Journal of Clinical Neurophysiology, American Clinical Neurophysiology Society, vol. 18, No. Mar. 2, 2001, pp. 106-127.

Paraschiv-Ionescu et al., "Ambulatory System for the Quantitative and Qualitative Analysis of Patients Treated with Spinal Cord Stimulation," Gait and Posture, vol. 20, Issue 2, pp. 113-125, Oct. 2004.

Slyper et al., "Action Capture with Accelerometers," Eurographics/ACM SIGGRAPH Symposium on Computer Animation, Carnegie Mellon University, Jul. 2008, 7 pp.

Smith et al., "How do sleep disturbance and chronic pain inter-relate? Insights from the longitudinal and cognitive-behavioral clinical trials literature," Sleep Medicine Reviews, YSMRV 286, Apr. 2004, pp. 1-14.

Smith et al., "Presleep cognitions in Patients with Insomnia Secondary to Chronic Pain," Journal of Behavioral Medicine, vol. 24, No. 1, Feb. 2001, pp. 93-114.

Tapia, "Activity Recognition from Accelerometer Data for Videogame Applications," http://alumni.media.mit.edu/~emunguia/html/videogames.htm, 7 pp., Dec. 2, 2003, printed Oct. 1, 2009.

Trolier-McKinstry et al., "Thin Film Piezoelectrics for MEMS," Journal of Electroceramics, v. 12, No. 1-2, Jan./Mar. 2004, pp. 7-17.

Tuck, "Implementing Auto-Zero Calibration Technique for Accelerometers," Freescale Semiconductor Application Note AN3447, Mar. 2007, 5 pp.

Tuisku, "Motor Activity Measured by Actometry in Neuropsychiatric Disorders," Department of Psychiatry, University ofHelsinki, Helsinki, Finland, Dec. 13, 2002, 115 pp.

Vega-Gonzalez, "Upper Limb Activity Monitoring," Arch Phys Med Rehabil, vol. 86, Mar. 2005, pp. 541-548.

Velten et al., "A New Three-Axis Accelerometer," Sensor '99—9th Int'l Traide Fair and Conference for Sensors/Transducers & Systems, Niirnberg, Germany, May 18-20, 1999, Sensor '99 Proceedings II, A 5.2, pp. 47-52, 1999.

* cited by examiner

POSTURE STATE DEFINITION CALIBRATION

TECHNICAL FIELD

The disclosure relates to medical devices and, more particularly, to programmable medical devices that deliver therapy.

BACKGROUND

A variety of medical devices are used for chronic, e.g., long-term, delivery of therapy to patients suffering from a variety of conditions, such as chronic pain, tremor, Parkinson's disease, epilepsy, urinary or fecal incontinence, sexual dysfunction, obesity, or gastroparesis. As examples, electrical stimulation generators are used for chronic delivery of electrical stimulation therapies such as cardiac pacing, neurostimulation, muscle stimulation, or the like. Pumps or other fluid delivery devices may be used for chronic delivery of therapeutic agents, such as drugs. Typically, such devices provide therapy continuously or periodically according to parameters contained within a program. A program may comprise respective values for each of a plurality of parameters, specified by a clinician.

In some cases, the patient may be allowed to activate and/or modify the therapy delivered by the medical device. For example, a patient may be provided with a patient programming device. The patient programming device communicates with a medical device to allow the patient to activate therapy and/or adjust therapy parameters. For example, an implantable medical device (IMD), such as an implantable neurostimulator, may be accompanied by an external patient programmer that permits the patient to activate and deactivate neurostimulation therapy and/or adjust the intensity of the delivered neurostimulation. The patient programmer may communicate with the IMD via wireless telemetry to control the IMD and/or retrieve information from the IMD.

SUMMARY

In general, the disclosure is directed to devices, systems, and techniques for adjusting posture state definitions used to determine a posture state of a patient. A medical device or system (e.g., an implantable medical device) may determine which posture state a patient has assumed in order to monitor patient activity and/or provide posture state-responsive therapy. The posture state definitions that define each posture state of a plurality of posture states may need to be calibrated or adjusted such that the postures assumed by the patient are accurately reflected by the posture states determined by the system.

For example, a patient may determine that the posture state responsive therapy is no longer working as expected or notice that the system is incorrectly identifying posture states (e.g., the system indicates that the patient is lying down when instead the patient is standing up). The patient may submit a request to the system to recalibrate (or update) the posture state definitions that define each posture state. Alternatively, the system may automatically generate the request (e.g., identify a trigger event) in response identifying inconsistent posture and activity data or excessive manual patient adjustments to therapy, for example. In response to receiving the request to update the posture state definitions, the system may obtain sensor data from a posture sensor when the patient indicates that the patient has assumed a known one posture state. The system can then compare the sensor data in the one posture state to the posture state definition for the one posture state and determine any difference between the two. The system can then apply that difference to all posture state definitions for all posture states in order to quickly update all of the posture state definitions without requiring the patient to assume each posture state separately. In some examples, a clinician may guide the patient through this procedure remotely, such as by sensing remote commands to the programmer or implantable medical device (IMD) directly.

In one example, the disclosure describes a system including: a memory configured to store a plurality of posture state definitions defining a plurality of posture states; and processing circuitry configured to: receive a request to update the plurality of posture state definitions; responsive to receiving the request, obtain sensor data for one posture state of the plurality of posture states, the sensor data generated while a patient is in the one posture state; determine a difference between the sensor data and a posture state definition of the posture state definitions corresponding to the one posture state; update, based on the difference, the plurality of posture state definitions; and store the updated plurality of posture state definitions in the memory.

In another example, the disclosure describes a method including: receiving, by processing circuitry, a request to update a plurality of posture state definitions, the plurality of posture state definitions defining a plurality of posture states and stored in a memory; responsive to receiving the request, obtaining, by the processing circuitry, sensor data for one posture state of the plurality of posture states, the sensor data generated while a patient is in the one posture state; determining, by the processing circuitry, a difference between the sensor data and a posture state definition of the posture state definitions corresponding to the one posture state; updating, by the processing circuitry and based on the difference, the plurality of posture state definitions; and storing, by the processing circuitry, the updated plurality of posture state definitions in a memory.

In another example, the disclosure describes a non-transitory computer-readable medium including instructions that, when executed, cause processing circuitry to: receive a request to update the plurality of posture state definitions, the plurality of posture state definitions defining a plurality of posture states and stored in a memory; responsive to receiving the request, obtain sensor data for one posture state of the plurality of posture states, the sensor data generated while a patient is in the one posture state; determine a difference between the sensor data and a posture state definition of the posture state definitions corresponding to the one posture state; update, based on the difference, the plurality of posture state definitions; and store the updated plurality of posture state definitions in the memory.

In another example, the disclosure describes means for receiving a request to update a plurality of posture state definitions, the plurality of posture state definitions defining a plurality of posture states and stored in a memory; means for, responsive to receiving the request, obtaining sensor data for one posture state of the plurality of posture states, the sensor data generated while a patient is in the one posture state; means for determining a difference between the sensor data and a posture state definition of the posture state definitions corresponding to the one posture state; means for updating, based on the difference, the plurality of posture state definitions; and means for storing the updated plurality of posture state definitions in a memory The details of one or more embodiments of the disclosure are set forth in the accompanying drawings and the description below. Other features, objects, and advantages of the disclosure will be apparent from the description and drawings, and from the claims.

DETAILED DESCRIPTION

Figure 1A:
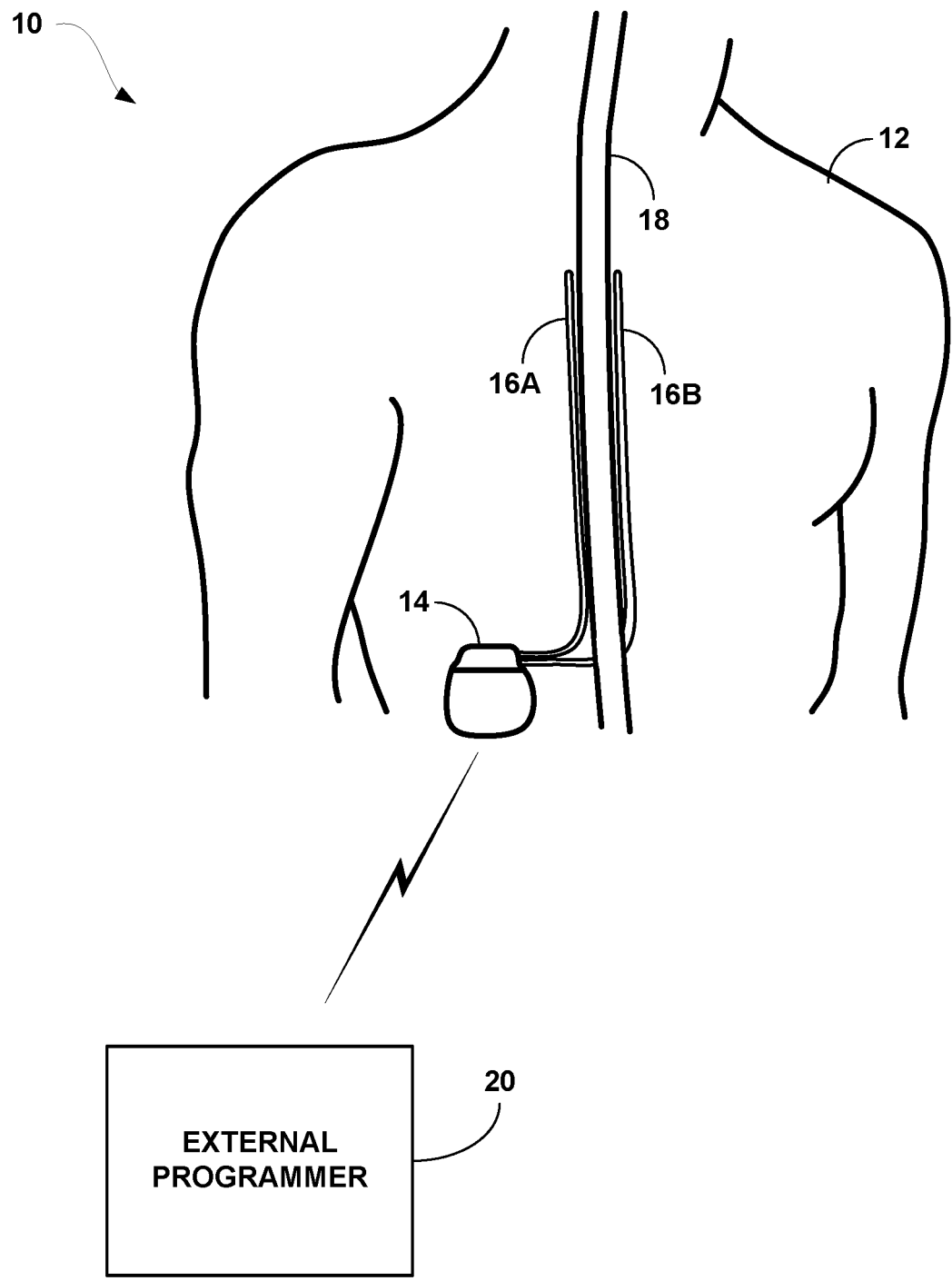
FIG. 1A is a conceptual diagram illustrating an implantable stimulation system including two implantable stimulation leads.

In general, the disclosure is directed to devices, systems, and techniques for updating or recalibrating posture state definitions used to determine a posture state of a patient. In some medical devices that deliver electrical stimulation therapy, therapeutic efficacy may change as the patient changes posture states. In general, a posture state may refer to a posture, an activity, or a combination of posture and activity. Efficacy may refer, in general, to a combination of complete or partial alleviation of symptoms alone, or in combination with a degree of undesirable side effects.

In one example, changes in posture state may cause changes in efficacy due to changes in distances between electrodes or other therapy delivery elements, e.g., due to temporary migration of leads or catheters caused by forces or stresses associated with different postures, or from changes in compression of patient tissue in different posture states. Also, posture state changes may present changes in symptoms or symptom levels, e.g., pain level. For example, for a given patient, sitting may be more painful on the patient's back than standing regardless of any migration or compression of the therapy delivery elements. To maintain therapeutic efficacy, it may be desirable to adjust therapy parameters based on different postures and/or activities engaged by the patient to maintain effective stimulation therapy. Therapy parameters may be adjusted directly or by selecting different programs or groups of programs defining different sets of therapy parameters.

A change in efficacy due to changes in posture state may require the patient to continually manage therapy by manually adjusting certain therapy parameters, such as amplitude, pulse rate, or pulse width, or selecting different therapy programs to achieve more efficacious therapy throughout many different posture states as result of the changing position of electrodes or otherwise changing symptoms. In some cases, a medical device may employ a posture state detector that detects the patient posture state. The medical device may adjust therapy parameters in response to different posture states as detected by the posture state detector. For posture state-responsive therapy, therapy adjustments in response to different posture states may be fully automatic (e.g., the system provides posture-responsive therapy without any user input) or semi-automatic (e.g., a user may provide approval of system-proposed changes).

Posture states may be detected by one or more sensors in a medical device. After implantation or attachment to the patient, the posture sensors need to be calibrated or adjusted to their specific orientation in the patient and/or the manner in which the specific patient performs actions. Calibration may involve asking the patient to assume each different posture state and have the medical device associate those posture states with the data generated from the posture sensors at the time each posture state was assumed by the patient. In some examples, the parameters, or boundaries, of each posture state as defined by the set of posture state definitions may need to be adjusted or modified to improve the accurate of posture state detection.

However, the initially created posture state definitions that that enable the system to determine a posture from the output of one or more sensors may become inaccurate over time. For example, the implantable medical device (IMD) may rotate, migrate, or flip within the patient. When this movement occurs, the posture state definitions may no longer accurately identify posture states of the patient because the output of the sensors is changed with respect to the patient's anatomy. In addition, the patient may change postures over time due to advancement of disease and/or injury. Although the patient could go through the full orientation process again, this can be very time consuming and potentially fatiguing for patients dealing with pain and mobility limitations This orientation process may also require that the patient visits a clinic. Moreover, posture responsive therapy may be inoperable until the patient is able to setup a clinic visit. Therefore, it may be beneficial for the system to provide a more immediate and less time consuming process to correct the system when posture states are no longer accurately detected.

As described herein, a system may update or re-calibrate posture state definitions by obtaining sensor data and comparing the sensor data to the posture state definition of a one single posture state. For example, the updating process may begin with a request for the system to update the posture state definitions. A user may provide the request to the system, such as the patient noticing that posture-responsive therapy is not operating appropriately, or the system may automatically generate the request in response to one or more triggers such as frequent manual patient amplitude adjustments, unusual posture state changes (e.g., too frequent or infrequent changes), activity that is not consistent with the detected posture (e.g., a lot of activity while the patient is detected to be lying down in a supine position), or any other such trigger. The system has previously stored posture state definitions that define a plurality of posture states (e.g., lying on each side, prone position, supine position, sitting, standing, etc.), but the system may adjust one or more parameters of each of the stored posture state definitions in response to receiving the request to update the posture state definitions.

In response to receiving the request to update the posture state definitions, the system may display one of the posture states for the patient to assume. This one posture state may be selected by the patient or automatically selected by the system. Once the patient has assumed the selected posture state, the system may obtain posture sensor data from one or more posture state sensors. This posture sensor data may be representative of the selected posture state that the patient has assumed. However, the posture sensor data may not match the posture state definition that defines the selected posture state. The system thus compares the posture sensor data to the posture state definition that defines the selected posture state. For example, the system may compare the sensed vector of the posture sensor data to a vector of the posture state definition (e.g., a vector defining the center of the posture state defined by the posture state definition) and determine the difference between the posture sensor data and the vector of the stored posture state definition for the selected posture state. This difference, such as the angular difference between the sensed vector and the vector of the stored posture state definition, may represent the misalignment of the stored posture state definition to the posture sensor data sensed while the patient is in the selected posture state. The system may then adjust each posture state definition of all of the posture state definitions according to the determined difference between the posture sensor data and the stored posture state definition for the selected posture state. The system may use the updated posture state definitions to accurately identify assumed posture states of the patient and provide posture responsive therapy to the patient.

As discussed herein, the system may be configured to update, or re-calibrate, all of the posture state definitions that define respective posture states of the patient based on a single posture sensor measurement. The system can apply the difference determined from the single posture sensor measurement from one posture state assumed by the patient to all posture state definitions for more efficient operation of the system. This also reduces the time burden and physical burden on a patient that may have mobility issues. In addition, this posture state definition update process is simple so that the patient can conduct the update process while at home, instead of going in to a clinic, from a few prompts on an external programmer or other device. The system may thus reduce the amount of time during which inaccurate posture state determinations are made and improve therapy efficacy through accurate posture responsive therapy.

FIG. 1A is a schematic diagram illustrating an implantable stimulation system 10 including a pair of implantable electrode arrays in the form of stimulation leads 16A and 16B. Although the techniques described in this disclosure may be generally applicable to a variety of medical devices including external and implantable medical devices (IMDs), application of such techniques to IMDs and, more particularly, implantable electrical stimulators such as neurostimulators will be described for purposes of illustration. More particularly, the disclosure will refer to an implantable spinal cord stimulation (SCS) system for purposes of illustration, but without limitation as to other types of medical devices.

As shown in FIG. 1A, system 10 includes an IMD 14 and external programmer 20 shown in conjunction with a patient 12. In the example of FIG. 1A, IMD 14 is an implantable electrical stimulator configured for SCS, e.g., for relief of chronic pain or other symptoms. Again, although FIG. 1A shows an implantable medical device, other embodiments may include an external stimulator, e.g., with percutaneously implanted leads. Stimulation energy is delivered from IMD 14 to spinal cord 18 of patient 12 via one or more electrodes of implantable leads 16A and 16B (collectively "leads 16"). Although two leads are shown in FIG. 1A, a single lead or three or more leads may be used in other examples. Each lead may include the same number of electrodes or vary in the number and position of electrodes. In some applications, such as SCS to treat chronic pain, the adjacent implantable leads 16 may have longitudinal axes that are substantially parallel to one another.

Although FIG. 1A is directed to SCS therapy, system 10 may alternatively be directed to any other condition that may benefit from stimulation therapy. For example, system 10 may be used to treat tremor, Parkinson's disease, epilepsy, urinary or fecal incontinence, sexual dysfunction, obesity, or gastroparesis. In this manner, system 10 may be configured to provide therapy taking the form of deep brain stimulation (DBS), pelvic floor stimulation (e.g., stimulation to treat urinary dysfunction or fecal dysfunction), gastric stimulation, or any other stimulation therapy. In addition, patient 12 is ordinarily a human patient.

Each of leads 16 may include electrodes (not shown in FIG. 1), and the parameters for a program that controls delivery of stimulation therapy by IMD 12 may include information identifying which electrodes have been selected for delivery of stimulation according to a stimulation program, the polarities of the selected electrodes, i.e., the electrode configuration for the program, and voltage or current amplitude, pulse rate, and pulse width of stimulation delivered by the electrodes. Delivery of stimulation pulses will be described for purposes of illustration. However, stimulation may be delivered in other forms such as continuous waveforms. Programs that control delivery of other therapies by IMD 12 may include other parameters, e.g., such as dosage amount, rate, or the like for drug delivery.

In the example of FIG. 1A, leads 16 carry one or more electrodes that are placed adjacent to the target tissue of the spinal cord. One or more electrodes may be disposed at a distal tip of a lead 16 and/or at other positions at intermediate points along the lead. Leads 16 may be implanted and coupled to IMD 14. Alternatively, as mentioned above, leads 16 may be implanted and coupled to an external stimulator, e.g., through a percutaneous port. In some cases, an external stimulator may be a trial or screening stimulation that is used on a temporary basis to evaluate potential efficacy to aid in consideration of chronic implantation for a patient. In additional examples, IMD 14 may be a leadless stimulator with one or more arrays of electrodes arranged on a housing of the stimulator rather than leads that extend from the housing.

The stimulation may be delivered via selected combinations of electrodes carried by one or both of leads 16. The target tissue may be any tissue affected by electrical stimulation energy, such as electrical stimulation pulses or waveforms. Such tissue includes nerves, smooth muscle, and skeletal muscle. In the example illustrated by FIG. 1A, the target tissue is spinal cord 18. Stimulation of spinal cord 18 may, for example, prevent pain signals from traveling through the spinal cord and to the brain of the patient. Patient 12 may perceive the interruption of pain signals as a reduction in pain and, therefore, efficacious therapy results.

The deployment of electrodes via leads 16 is described for purposes of illustration, but arrays of electrodes may be deployed in different ways. For example, a housing associated with a leadless stimulator may carry one or more arrays of electrodes, e.g., rows and/or columns (or other patterns), to which shifting operations may be applied. Such electrodes may be arranged as surface electrodes, ring electrodes, or protrusions. As a further alternative, electrode arrays may be formed by rows and/or columns of electrodes on one or more paddle leads. In some examples, electrode arrays may include electrode segments, which may be arranged at respective positions around a periphery of a lead, e.g., arranged in the form of one or more segmented rings around a circumference of a cylindrical lead.

In the example of FIG. 1A, stimulation energy is delivered by IMD 14 to the spinal cord 18 to reduce the amount of pain perceived by patient 12. As described above, IMD 14 may be used with a variety of different pain therapies, such as peripheral nerve stimulation (PNS), peripheral nerve field stimulation (PNFS), DBS, cortical stimulation (CS), pelvic floor stimulation, gastric stimulation, and the like. The electrical stimulation delivered by IMD 14 may take the form of electrical stimulation pulses or continuous stimulation waveforms, and may be characterized by controlled voltage levels or controlled current levels, as well as pulse width and pulse rate in the case of stimulation pulses.

In some examples, IMD 14 delivers stimulation therapy according to one or more programs. A program defines one or more parameters that define an aspect of the therapy delivered by IMD 14 according to that program. For example, a program that controls delivery of stimulation by IMD 14 in the form of pulses may define a voltage or current pulse amplitude, a pulse width, a pulse rate, for stimulation pulses delivered by IMD 14 according to that program. Moreover, therapy may be delivered according to multiple programs, wherein multiple programs are contained within each of a plurality of groups.

Each program group may support an alternative therapy selectable by patient 12, and IMD 14 may deliver therapy according to the multiple programs in a group. IMD 14 may rotate through the multiple programs of the group when delivering stimulation such that numerous conditions of patient 12 are treated. As an illustration, in some cases, stimulation pulses formulated according to parameters defined by different programs may be delivered on a time-interleaved basis. For example, a group may include a program directed to leg pain, a program directed to lower back pain, and a program directed to abdomen pain. In this manner, IMD 14 may treat different symptoms substantially simultaneously.

During use of IMD 14 to treat patient 12, movement of patient 12 among different posture states may affect the ability of IMD 14 to deliver consistent efficacious therapy. For example, leads 16 may migrate toward IMD 14 when patient 12 bends over, resulting in displacement of electrodes and possible disruption in delivery of effective therapy. For example, stimulation energy transferred to target tissue may be reduced due to electrode migration (e.g., electrodes moving further from the target tissue), causing reduced efficacy in terms of relief of symptoms such as pain. As another example, leads 16 may be compressed towards spinal cord 18 when patient 12 lies down. Such compression may cause an increase in the amount of stimulation energy transferred to target tissue. In this case, the amplitude of stimulation therapy may need to be decreased to avoid causing patient 12 additional pain or unusual sensations, which may be considered undesirable side effects that undermine overall efficacy.

Many other examples of reduced efficacy due to increased coupling or decreased coupling of stimulation energy to target tissue may occur due to changes in posture and/or activity level associated with patient posture state. To avoid or reduce possible disruptions in effective therapy due to posture state changes, IMD 14 may include a posture state module (e.g., including one or more posture sensors) that detects an orientation of patient 12 and/or the posture state of patient 12 and causes the IMD 14 to automatically adjust stimulation according to the detected posture state. For example, a posture state module may include a posture state sensor such as an accelerometer that detects when patient 12 lies down, stands up, or otherwise changes posture.

In response to a posture state indication by the posture state module, IMD 14 may change a program group, program, stimulation amplitude, pulse width, pulse rate, and/or one or more other parameters, groups or programs to maintain therapeutic efficacy. When a patient lies down, for example, IMD 14 may automatically reduce stimulation amplitude so that patient 12 does not need to reduce stimulation amplitude manually. In some cases, IMD 14 may communicate with external programmer 20 to present a proposed change in stimulation in response to a posture state change, and receive approval or rejection of the change from a user, such as patient 12 or a clinician, before automatically applying the therapy change. Additionally, in response to a posture state change, IMD 14 may communicate with external programmer 20 to provide a notification to a user, such a clinician, that patient 12 has potentially experienced a fall.

A user, such as a clinician or patient 12, may interact with a user interface of external programmer 20 to program IMD 14. Programming of IMD 14 may refer generally to the generation and transfer of commands, programs, or other information to control the operation of IMD 14. For example, external programmer 20 may transmit programs, parameter adjustments, program selections, group selections, or other information to control the operation of IMD 14, e.g., by wireless telemetry. As one example, external programmer 20 may transmit parameter adjustments to support therapy changes due to posture changes by patient 12. As another example, a user may select programs or program groups. Again, a program may be characterized by an electrode combination, electrode polarities, voltage or current amplitude, pulse width, pulse rate, and/or duration. A group may be characterized by multiple programs that are delivered simultaneously or on an interleaved or rotating basis.

A user interface of external programmer 20 may indicate to the user the posture state in which the patient 12 currently resides. This patient posture state may be a static posture that does not take into account activity level (e.g., mobility), an activity level that does not take into account posture, or some combination of the posture and activity level that describes the physical position and movement (or mobility) of patient 12. As an example, posture may be characterized as one of the following posture states: standing, sitting, lying down on back (supine), lying down on front (prone), lying down on left side, and lying down on right side. Activity level, or mobility, may be characterized as one of high, medium and low, or be characterized in terms of a numeric scale, e.g., 1-10 or 1-12. In other examples, other gradations, e.g., high, medium high, medium, medium low, and low, or other numerical scales may be used to characterize activity level. Respective thresholds, or parameters, may be used in the posture state definitions to define each of these levels. Alternatively, a single mobility posture state may be used which indicates that the activity is above a certain threshold.

The mobility posture state may be applicable regardless of the other static orientations also detected or only indicated when another posture is also detected (e.g., the mobility posture state may only be determined when the upright or standing posture is also detected).

A posture state may indicate a combination of one of the above postures with one of the above activity levels. For some postures, such as lying down postures, the posture state may not need to consider activity level, as the patient may be less likely to undertake any significant activity in such postures. In other cases, all posture states may take into account posture and activity level, even if there is minimal activity in a particular posture. Posture state may be determined based on posture information and/or activity level information generated by a posture state module, which may include one or more accelerometers or other posture or activity level sensors.

A patient posture state may be represented by a posture state indication presented by the user interface of programmer 20 as a visible, audible, or tactile indication. When presented as a visible indication, the posture state indication may be, for example, a graphical representation, a symbolic icon, a textual representation, such as word or number, an arrow, or any other type of indication. The visible indication may be presented via a display, such as a liquid crystal display (LCD), dot matrix display, organic light-emitting diode (OLED) display, presence sensitive screen (e.g., a touch screen), or the like. In other cases, the visible indication may be provided in a translucent area that is selectively backlit to indicate a posture. An audible indication may be produced by programmer 20 as spoken words stating a posture state, or different audible tones, different numbers of tones, or other audible information generated by the programmer to indicate posture state. A tactile indication of posture state may be produced by programmer 20, for example, in the form of different numbers of vibratory pulses delivered in sequence or vibratory pulses of different lengths, amplitudes, or frequencies.

Programmer 20 may present multiple indications representative of different patient posture states. IMD 14 may communicate a patient posture state according to a posture state parameter value sensed by a posture state module (e.g., data generated by the module) to external programmer 20, e.g., by wireless telemetry. For example, IMD 14 may transmit a posture state indication to programmer 20 on a periodic, intermittent or continuous basis or in response to a posture state change. Alternatively, programmer 20 may request a posture state indication from IMD 14 on a periodic, intermittent or continuous basis. External programmer 20 then may select and present the associated posture state indication. In some examples, IMD 14 may transmit posture data to programmer 20, and programmer 20 may determine the posture states based on the posture data and posture state definitions.

In some cases, external programmer 20 may be characterized as a physician or clinician programmer if it is primarily intended for use by a physician or clinician. In other cases, external programmer 20 may be characterized as a patient programmer if it is primarily intended for use by a patient. A patient programmer is generally accessible to patient 12 and, in many cases, may be a portable device that may accompany the patient throughout the patient's daily routine. In general, a physician or clinician programmer may support selection and generation of programs by a clinician for use by IMD 14, whereas a patient programmer may support adjustment and selection of such programs by a patient during ordinary use. The clinician programmer may be configured to control all features or aspects of therapy, while the patient programmer may have limited programming functionality (e.g., programming limited to certain features and/or limited as to the amount of adjustment the patient can make using the patient programmer).

A patient programmer or clinician programmer may is a hand held device. A clinician programmer may be used to communicate with multiple IMDs 14 (FIG. 1A) and 26 (FIG. 1B) within different patients. In this manner, clinician programmer may be capable of communicating with many different devices and retain patient data separate for other patient data. In some embodiments, the clinician programmer may be a larger device that may be less portable, such as a notebook computer, workstation, or even a remote computer that communicates with IMD 14 or 26 via a remote telemetry device.

At the distal tips of leads 16 are one or more electrodes (not shown) that transfer the electrical stimulation from the lead to the tissue. The electrodes may be electrode pads on a paddle lead, circular (e.g., ring) electrodes surrounding the body of leads 16, conformable electrodes, cuff electrodes, segmented electrodes, or any other type of electrodes capable of forming unipolar, bipolar or multipolar electrode configurations for therapy. In general, ring electrodes arranged at different axial positions at the distal ends of leads 16 will be described for purposes of illustration.

As described herein, system 10 (e.g., IMD 14 and/or external programmer 20) may include a memory configured to store a plurality of posture state definitions defining a plurality of posture states and processing circuitry configured to receive a request to update the plurality of posture state definitions. In response to receiving the request, the processing circuitry of system 10 may obtain sensor data for one posture state of the plurality of posture states, wherein a posture sensor generates the sensor data while patient 12 is in the one posture state. In this manner, system 10 understands that the sensor data is intended to be representative of the one posture state assumed by patient 12. The processing circuitry may then determine a difference between the sensor data and a posture state definition of the posture state definitions corresponding to the one posture state. This difference may be indicative of how the posture sensor is no longer calibrated correctly with the posture state definitions. Based on the difference, the processing circuitry may then update the plurality of posture state definitions and store the updated plurality of posture state definitions in the memory. In this manner, the processing circuitry is configured to update a plurality of posture state definitions for many posture states based on only posture data generated for a single posture state.

In some examples, the processing circuitry is configured to, responsive to receiving the request, output, via a user interface (e.g., a user interface of external programmer 20), a representation of the one posture state that patient 12 is to assume. System 10 may select the one posture state as a default posture state intended for calibrating the posture state definitions or the posture state detected when system 10 receives the request to update the posture state definitions. For example, the posture state detected when the request is received may be the posture state that patient 12 has determined is no longer correct. In other examples, the processing circuitry is configured to receive, via the user interface, a user selection of the one posture state from at least a subset of the plurality of posture states. For example, the user interface may provide a pull down menu from which patient 12 can select which one posture state should be assumed for the calibration process. This may be helpful for some patients 12 in which some posture states may be more comfortable than others.

System 10 may also receive a user input confirming patient 12 is in the one posture state. For example, the user interface may receive selection of a button indicating that patient 12 is in the one posture state for which the posture sensor data will be generated. Responsive to receiving the user input, system 10 may obtain the sensor data for the one posture state. System 10 may control the posture sensor to generate the data or system 10 may simply sample the posture sensor data being generated by the posture sensor over time.

In some examples, a user interface of external programmer 20, for example, may be configured to receive the request to update the plurality of posture state definitions. For example, the user interface may present a selectable button that, when selected, the user interface generates the request. In other examples, system 10 may automatically generate the request due to a trigger event. Trigger events may be detected events that indicate the currently stored posture state definitions may not accurately define the different posture states assumable by patient 12. The trigger event may be a discrepancy between detected posture states and detected activity. System 10 may determine that a sensed posture state does not correspond to detected patient activity and, responsive to determining that the sensed posture state does not correspond to the detected patient activity, automatically generate the trigger event. For example, the sensed posture state may not correspond to detected patient activity when the sensed posture state is a supine posture state and system 10 detects a high level activity normally associated with running or jumping. In this manner, system 10 may determine that the detected posture state does not correspond with the detected activity level of patient 12. Other trigger events may include manual user adjustment of stimulation amplitude at a frequency above a threshold (e.g., indicating improper posture state detection requiring manual override of therapy), posture state detection not correlating with certain times of day (e.g., detected standing during sleeping hours), or other such inconsistencies between two or more sensed metrics associated with patient 12.

In some examples, IMD 14 includes a posture sensor configured to generate sensor data while patient 12 is in any posture state, such as the one posture state selected for calibration. The posture sensor may generate posture sensor data on demand and/or at predetermined frequencies. In some examples, the posture sensor may generate sensor data that identifies a vector, vector components, vector amplitude, or any combination thereof. If the posture sensor comprises a multi-axis accelerometer, the sensor data may indicate an acceleration vector in three dimensional space corresponding to gravity. IMD 14 and/or external programmer 20 may employ this sensor data to determine the orientation, or posture state, of patient 12 with respect to gravity. If IMD 14 moves or shifts within patient 12, the spatial connection between sensor data and patient posture changes and can reduce the accurate of previously stored posture state definitions.

In this manner, IMD 14 may update the posture state definitions using newly acquired sensor data obtained for one of the posture states. Processing circuitry of IMD 14 may be configured to determine a first vector from the sensor data and determine a second vector for the posture state definition corresponding to the one posture state. The processing circuitry may then determine the difference between by the sensor data and the posture state definition by determining the difference between the first vector and the second vector. This difference may be defined by one or more angles between the first and second vectors, changes in vector components (e.g., amplitudes of each vector components) between the first and second vectors, or any other method by which the difference between the first and second vectors can be calculated. The processing circuitry can then update the plurality of posture state definitions by subtracting the difference from a respective vector for each posture state definition of the plurality of posture state definitions. The vector of the posture state definitions may be the vector that defines the center of the posture state, but in other examples, the vector of the sensor data can be used to adjust any aspect of a posture state definition, such as one or more boundaries of respective posture states. Once the processing circuitry updates the plurality of posture state definitions, the processing circuitry can store the updated plurality of posture definitions and continue to deliver posture responsive therapy according to the updated plurality of posture state definitions.

Figure 1B:
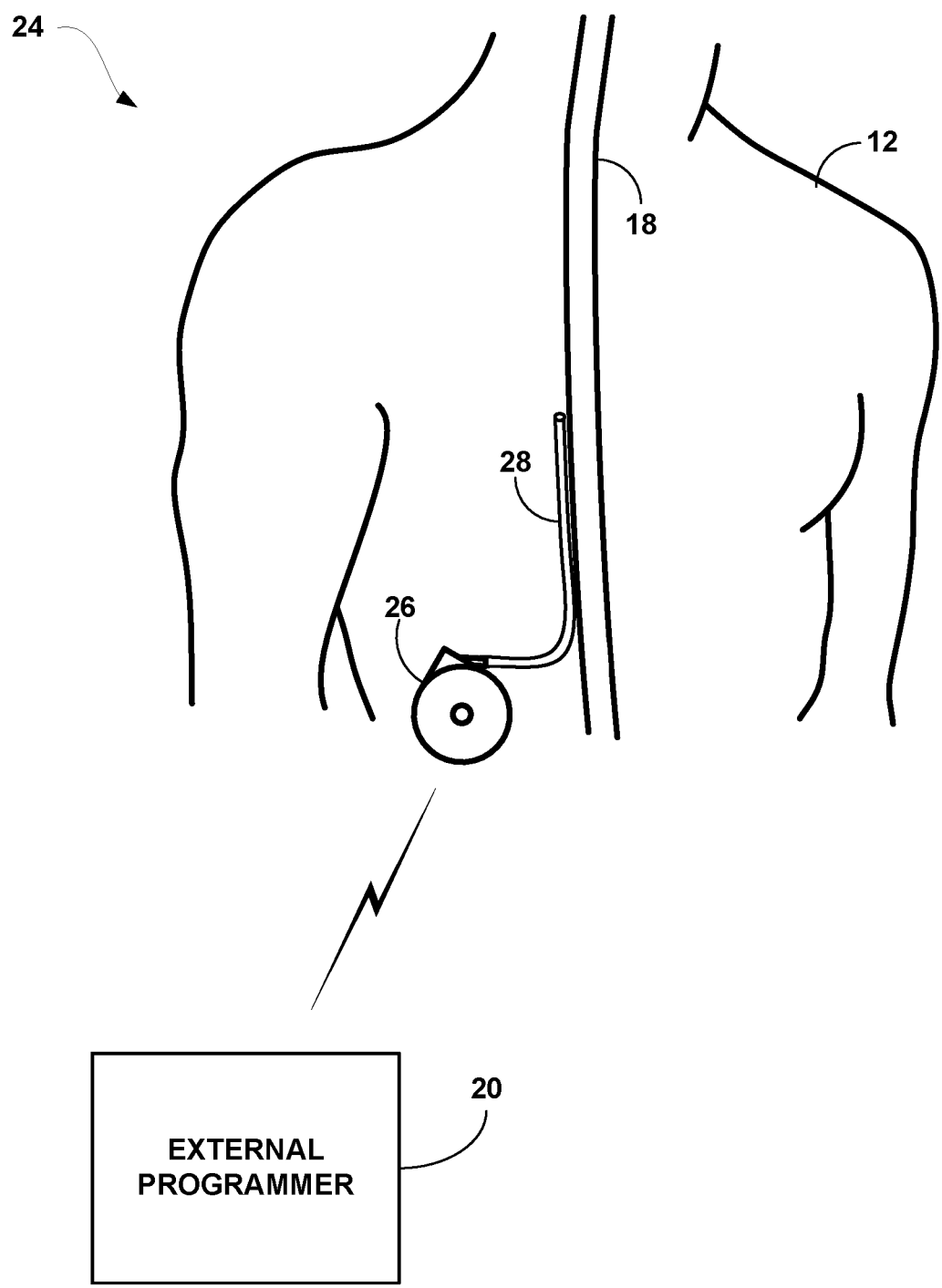
FIG. 1B is a conceptual diagram illustrating an implantable drug delivery system including a delivery catheter.

FIG. 1B is a conceptual diagram illustrating an implantable drug delivery system 24 including one delivery catheter 28 coupled to IMD 26. As shown in the example of FIG. 1B, drug delivery system 24 is substantially similar to system 10. However, drug delivery system 24 performs the similar therapy functions via delivery of drug stimulation therapy instead of electrical stimulation therapy. IMD 26 functions as a drug pump in the example of FIG. 1B, and IMD 26 communicates with external programmer 20 to initialize therapy or modify therapy during operation. In addition, IMD 26 may be refillable to allow chronic drug delivery.

Although IMD 26 is shown as coupled to only one catheter 28 positioned along spinal cord 18, additional catheters may also be coupled to IMD 26. Multiple catheters may deliver drugs or other therapeutic agents to the same anatomical location or the same tissue or organ. Alternatively, each catheter may deliver therapy to different tissues within patient 12 for the purpose of treating multiple symptoms or conditions. In some examples, IMD 26 may be an external device that includes a percutaneous catheter that forms catheter 28 or that is coupled to catheter 28, e.g., via a fluid coupler. In other examples, IMD 26 may include both electrical stimulation as described in IMD 14 and drug delivery therapy.

IMD 26 may also operate using parameters that define the method of drug delivery. IMD 26 may include programs, or groups of programs, that define different delivery methods for patient 14. For example, a program that controls delivery of a drug or other therapeutic agent may include a titration rate or information controlling the timing of bolus deliveries. Patient 14 may use external programmer 20 to adjust the programs or groups of programs to regulate the therapy delivery.

Similar to IMD 14, IMD 26 may include a posture state module that monitors the patient 12 posture state and adjusts therapy accordingly. For example, the posture state module may indicate that patient 12 transitions from lying down to standing up. IMD 26 may automatically increase the rate of drug delivered to patient 12 in the standing position if patient 12 has indicated that pain increased when standing. This automated adjustment to therapy based upon posture state may be activated for all or only a portion of the programs used by IMD 26 to deliver therapy.

Figure 2:
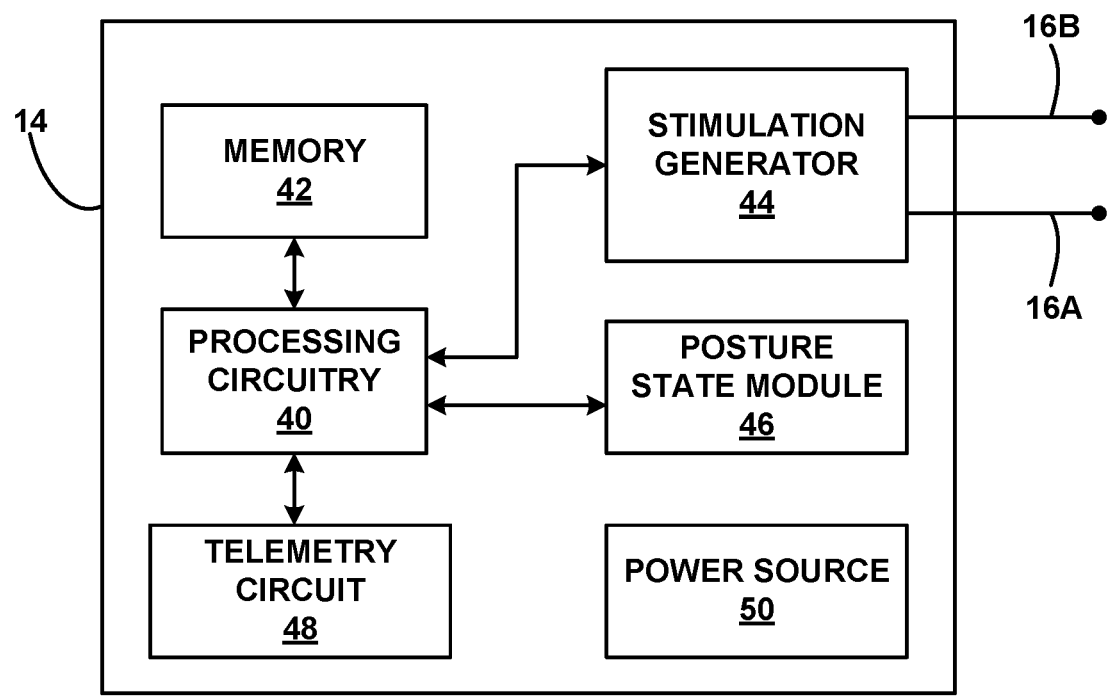
FIG. 2 is a functional block diagram illustrating various components of an implantable electrical stimulator.

FIG. 2 is a functional block diagram illustrating various components of an IMD 14. In the example of FIG. 2, IMD 14 includes a processing circuitry 40, memory 42, stimulation generator 44, posture state module 46, telemetry circuit 48, and power source 50. Memory 42 may store instructions for execution by processing circuitry 40, stimulation therapy data, posture state definitions, posture state calibration instructions, posture state data, and any other information regarding therapy or patient 12. Therapy information may be recorded for long-term storage and retrieval by a user, and the therapy information may include any data created by or stored in IMD 14. Memory 42 may include separate memories for storing instructions, posture state information (e.g., sets of posture state definitions), program histories, and any other data that may benefit from separate physical memory modules.

Processing circuitry 40 controls stimulation generator 44 to deliver electrical stimulation via electrode combinations formed by electrodes in one or more electrode arrays. For example, stimulation generator 44 may deliver electrical stimulation therapy via electrodes on one or more leads 16, e.g., as stimulation pulses or continuous waveforms. Components described as processors within IMD 14, external programmer 20 or any other device described in this disclosure may each comprise one or more processors, such as one or more microprocessors, digital signal processors (DSPs), application specific integrated circuits (ASICs), field programmable gate arrays (FPGAs), programmable logic circuitry, or the like, either alone or in any suitable combination.

Stimulation generator 44 may include stimulation generation circuitry to generate stimulation pulses or waveforms and switching circuitry to switch the stimulation across different electrode combinations, e.g., in response to control by processing circuitry 40. In particular, processing circuitry 40 may control the switching circuitry on a selective basis to cause stimulation generator 44 to deliver electrical stimulation to selected electrode combinations and to shift the electrical stimulation to different electrode combinations in a first direction or a second direction when the therapy must be delivered to a different location within patient 12. In other embodiments, stimulation generator 44 may include multiple current or voltage sources to drive more than one electrode combination at one time. In this case, stimulation generator 44 may decrease a stimulation amplitude (e.g., a current or voltage amplitude) to the first electrode combination and simultaneously increase a stimulation amplitude to the second electrode combination to shift the stimulation therapy.

An electrode combination may be represented by a data stored in a memory location, e.g., in memory 42, of IMD 14. Processing circuitry 40 may access the memory location to determine the electrode combination and control stimulation generator 44 to deliver electrical stimulation via the indicated electrode combination. To change electrode combinations, current or voltage amplitudes, pulse rates, or pulse widths, processing circuitry 40 may command stimulation generator 44 to make the appropriate changes to therapy according to instructions within memory 42 and rewrite the memory location to indicate the changed therapy. In other examples, rather than rewriting a single memory location, processing circuitry 40 may make use of two or more memory locations.

When activating stimulation, processing circuitry 40 may access not only the memory location specifying the electrode combination but also other memory locations specifying various stimulation parameters such as voltage or current amplitude, pulse width and pulse rate. Stimulation generator 44, e.g., under control of processing circuitry 40, then makes use of the electrode combination and parameters in formulating and delivering the electrical stimulation to patient 12. Processing circuitry 40 also may control telemetry circuit 48 to send and receive information to and from external programmer 20. For example, telemetry circuit 48 may send information to and receive information from patient programmer 30. An exemplary range of electrical stimulation parameters likely to be effective in treating chronic pain, e.g., when applied to spinal cord 18, are listed below. While stimulation pulses are described, stimulation signals may be of any of a variety of forms such as sine waves or the like.

1. Pulse Rate: between approximately 0.5 Hz and 1200 Hz, more preferably between approximately 5 Hz and 250 Hz, and still more preferably between approximately 30 Hz and 130 Hz.
2. Amplitude: between approximately 0.1 volts and 50 volts, more preferably between approximately 0.5 volts and 20 volts, and still more preferably between approximately 1 volt and 10 volts. In other embodiments, a current amplitude may be defined as the biological load in the voltage that is delivered. For example, the range of current amplitude may be between 0.1 milliamps (mA) and 50 mA.
3. Pulse Width: between about 10 microseconds and 5000 microseconds, more preferably between approximately 100 microseconds and 1000 microseconds, and still more preferably between approximately 180 microseconds and 450 microseconds.

In other applications, different ranges of parameter values may be used. For deep brain stimulation (DBS), as one example, alleviation or reduction of symptoms associated with Parkinson's disease, essential tremor, epilepsy or other disorders may make use of stimulation having a pulse rate in the range of approximately 0.5 to 1200 Hz, more preferably 5 to 250 Hz, and still more preferably 30 to 185 Hz, and a pulse width in the range of approximately 10 microseconds and 5000 microseconds, more preferably between approximately 60 microseconds and 1000 microseconds, still more preferably between approximately 60 microseconds and 450 microseconds, and even more preferably between approximately 60 microseconds and 150 microseconds. Amplitude ranges such as those described above with reference to SCS, or other amplitude ranges, may be used for different DBS applications.

Processing circuitry 40 stores stimulation parameters in memory 42, e.g., as programs and groups of programs. Upon selection of a particular program group, processing circuitry 40 may control stimulation generator 44 to deliver stimulation according to the programs in the groups, e.g., simultaneously or on a time-interleaved basis. A group may include a single program or multiple programs. As mentioned previously, each program may specify a set of stimulation parameters, such as amplitude, pulse width and pulse rate. In addition, each program may specify a particular electrode combination for delivery of stimulation. Again, the electrode combination may specify particular electrodes in a single array or multiple arrays, e.g., on a single lead or among multiple leads.

Posture state module 46 allows IMD 14 to sense the patient posture state, e.g., posture, activity or any other static position or motion of patient 12. In the example of FIG. 2, posture state module 46 may include one or more accelerometers, such as three-axis accelerometers, capable of detecting static orientation or vectors in three-dimensions. For example, posture state module 46 may include one or more micro-electro-mechanical accelerometers. In other examples, posture state module 46 may alternatively or additionally include one or more gyroscopes, pressure transducers or other sensors to sense the posture state of patient 12. Posture state information (e.g., posture data or sensor data) generated by posture state module 46 and processing circuitry 40 may correspond to an activity and/or posture undertaken by patient 12 or a gross level of physical activity, e.g., activity counts based on footfalls or the like.

In some examples, processing circuitry 40 processes the analog output of the posture state sensor in posture state module 46 to determine activity and/or posture data. For example, processing circuitry 40 or a processor of posture state module 46 may process the raw signals provided by the posture state sensor to determine activity counts. In some examples, processing circuitry 40 may process the signals provided by the posture state sensor to determine velocity of motion information along each axis. In some examples, processing circuitry 40 may transmit the determined posture states and/or the raw posture data to another device, such as programmer 20.

In one example, each of the x, y, and z signals provided by the posture state sensor has both a DC component and an AC component. The DC components may describe the gravitational force exerted upon the sensor and may thereby be used to determine orientation of the sensor within the gravitational field of the earth. Assuming the orientation of the sensor is relatively fixed with respect to patient 12, the DC components of the x, y and z signals may be utilized to determine the patient's orientation within the gravitational field, and hence to determine the posture of the patient.

The AC component of the x, y and z signals may yield information about patient motion. In particular, the AC component of a signal may be used to derive a value for an activity describing the patient's motion. This activity may involve a level, direction of motion, or acceleration of patient 12.

One method for determining the activity is an activity count. An activity count may be used to indicate the activity or activity level of patient 12. For example, a signal processor may sum the magnitudes of the AC portion of an accelerometer signal for "N" consecutive samples. For instance, assuming sampling occurs as 25 Hz, "N" may be set to 25, so that count logic provides the sum of the samples that are obtained in one second. This sum may be referred to as an "activity count." In other examples, sampling may be conducted faster than 25 Hz (e.g., 50 Hz or greater) or much slower (e.g., less than 1 Hz or 0.5 Hz) and still capture patient activity (e.g., walking, standing, etc.).

The number "N" of consecutive samples may be selected by processing circuitry 40 or a processor of posture state module 46 based on the current posture state, if desired. The activity count may be the activity portion of the posture state parameter value that may be added to the posture portion. The resulting posture state parameter value may then incorporate both activity and posture to generate an accurate indication of the motion of patient 12.

As another example, the activity portion of the posture state parameter value may describe a direction of motion. This activity parameter may be associated with a vector and an associated tolerance, which may be a distance from the vector. Another example of an activity parameter relates to acceleration. A value quantifying a level of change of motion over time in a particular direction may be associated with the activity portion of a posture state parameter value. One or more parameters, e.g. a threshold, may be defined by the set of posture state definitions for determining when the activity arises to a certain posture state such as a mobile posture state. In some examples, the set of posture state definitions includes multiple posture state definitions. In other examples, the set of posture state definitions may only include a single posture state definition.

Posture state information from posture state module 46 may be stored in memory 42 for later review by a clinician, used to adjust therapy, present a posture state indication to patient 12 via programmer 20, or some combination thereof. As an example, processing circuitry 40 may record the posture state parameter value, or output, of the 3-axis accelerometer and assign the posture state parameter value to a certain predefined posture indicated by the posture state parameter value. In this manner, IMD 14 may be able to track how often patient 12 remains within a certain posture.

IMD 14 may also store which group or program was being used to deliver therapy when patient 12 was in the sensed posture. Further, processing circuitry 40 may also adjust therapy for a new posture when posture state module 46 indicates that patient 12 has in fact changed postures. Therefore, IMD 14 may be configured to provide posture responsive stimulation therapy to patient 12. Stimulation adjustments in response to posture state may be automatic or semi-automatic (subject to patient approval). In many cases, fully automatic adjustments may be desirable so that IMD 14 may react more quickly to posture state changes.

A posture state parameter value from posture state module 46 that indicates the posture state may constantly vary throughout the day of patient 12. However, a certain activity (e.g., walking, running, or biking or other mobile event) or a posture (e.g., standing, sitting, or lying down) may include multiple posture state parameter values from posture state module 46. Memory 42 may include definitions for each posture state of patient 12. Together, these definitions may be described as a set of posture state definitions. In one example, the definitions of each posture state may be illustrated as a cone in three-dimensional space. Whenever the posture state parameter value, e.g., a vector, from the three-axis accelerometer of posture state module 46 resides within a predefined cone, processing circuitry 40 indicates that patient 12 is in the posture state of the cone. A cone is described for purposes of example. Other definitions of posture states may be illustrated as other shapes, e.g., donuts, in three-dimensional space. In other examples, posture state parameter value from the 3-axis accelerometer may be compared to a look-up table or equation to determine the posture state in which patient 12 currently resides.

Posture responsive therapy (or posture responsive stimulation) may enable IMD 14 to implement a certain level of automation in therapy adjustments. Automatically adjusting stimulation may free patient 12 from the constant task of manually adjusting therapy each time patient 12 changes posture or starts and stops a certain posture state. Such manual adjustment of stimulation parameters can be tedious, requiring patient 12 to, for example, depress one or more keys of programmer 20 multiple times during the patient posture state to maintain adequate symptom control. In some examples, patient 12 may eventually be able to enjoy posture state responsive stimulation therapy without the need to continue making changes for different postures via programmer 20. Instead, patient 12 may transition immediately or over time to fully automatic adjustments based on posture state.

Although posture state module 46 is described as containing a 3-axis accelerometer, posture state module 46 may contain multiple single-axis accelerometers, dual-axis accelerometers, 3-axis accelerometers, or some combination thereof. In some examples, an accelerometer or other sensor may be located within or on IMD 14, on one of leads 16

(e.g., at the distal tip or at an intermediate position), on an additional sensor lead positioned somewhere within patient 12, within an independent implantable sensor, or even worn on patient 12. For example, one or more microsensors may be implanted within patient 12 to communicate posture state information wirelessly to IMD 14. In this manner, the patient 12 posture state may be determined from multiple posture state sensors placed at various locations on or within the body of patient 12.

In other examples, posture state module 46 may additionally or alternatively be configured to sense one or more physiological parameters of patient 12. For example, physiological parameters may include heart rate, electromyography (EMG), an electroencephalogram (EEG), an electrocardiogram (ECG), temperature, respiration rate, or pH. These physiological parameters may be used by processing circuitry 40, in some examples, to confirm or reject changes in sensed posture state that may result from vibration, patient travel (e.g., in an aircraft, car or train), or some other false positive of posture state.

Wireless telemetry in IMD 14 with external programmer 20 or another device may be accomplished by radio frequency (RF) communication or proximal inductive interaction of IMD 14 with external programmer 20. Telemetry circuit 48 may send information to and receive information from external programmer 20 on a continuous basis, at periodic intervals, at non-periodic intervals, or upon request from the stimulator or programmer. To support RF communication, telemetry circuit 48 may include appropriate electronic components, such as amplifiers, filters, mixers, encoders, decoders, and the like.

Power source 50 delivers operating power to the components of IMD 14. Power source 50 may include a small rechargeable or non-rechargeable battery and a power generation circuit to produce the operating power. Recharging may be accomplished through proximal inductive interaction between an external charger and an inductive charging coil within IMD 14. As one example, external programmer 20 may include the charger to recharge power source 50 of IMD 14. Hence, the programmer and charger may be integrated in the same device. Alternatively, in some cases, a charger unit may serve as an intermediate device that communicates with both the IMD and the programmer. In some examples, power requirements may be small enough to allow IMD 14 to utilize patient motion and implement a kinetic energy-scavenging device to trickle charge a rechargeable battery. In other examples, traditional batteries may be used for a limited period of time. As a further alternative, an external inductive power supply could transcutaneously power IMD 14 when needed or desired.

Figure 3:
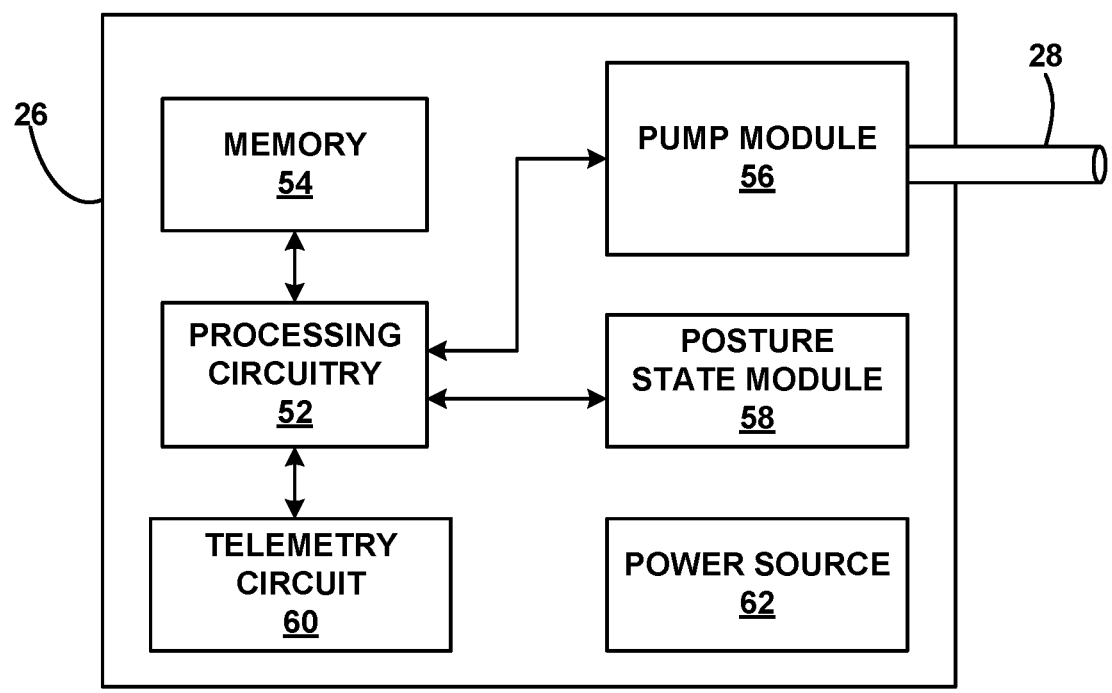
FIG. 3 is a functional block diagram illustrating various components of an implantable drug pump.

FIG. 3 is a functional block diagram illustrating various components of an IMD 26 that is a drug pump. IMD 26 is a drug pump that operates substantially similar to IMD 14 of FIG. 2. IMD 26 includes processing circuitry 52, memory 54, pump module 56, posture state module 58, telemetry circuit 60, and power source 62. Instead of stimulation generator 44 of IMD 14, IMD 26 includes pump module 56 for delivering drugs or some other therapeutic agent via catheter 28. Pump module 56 may include a reservoir to hold the drug and a pump mechanism to force drug out of catheter 28 and into patient 12.

Processing circuitry 52 may control pump module 56 according to therapy instructions stored within memory 54. For example, memory 54 may contain the programs or groups of programs that define the drug delivery therapy for patient 12. A program may indicate the bolus size or flow rate of the drug, and processing circuitry 52 may accordingly deliver therapy. Processing circuitry 52 may also use posture state information from posture state module 58 to adjust drug delivery therapy when patient 12 changes posture states, e.g., adjusts his (or her) posture.

Figure 4:
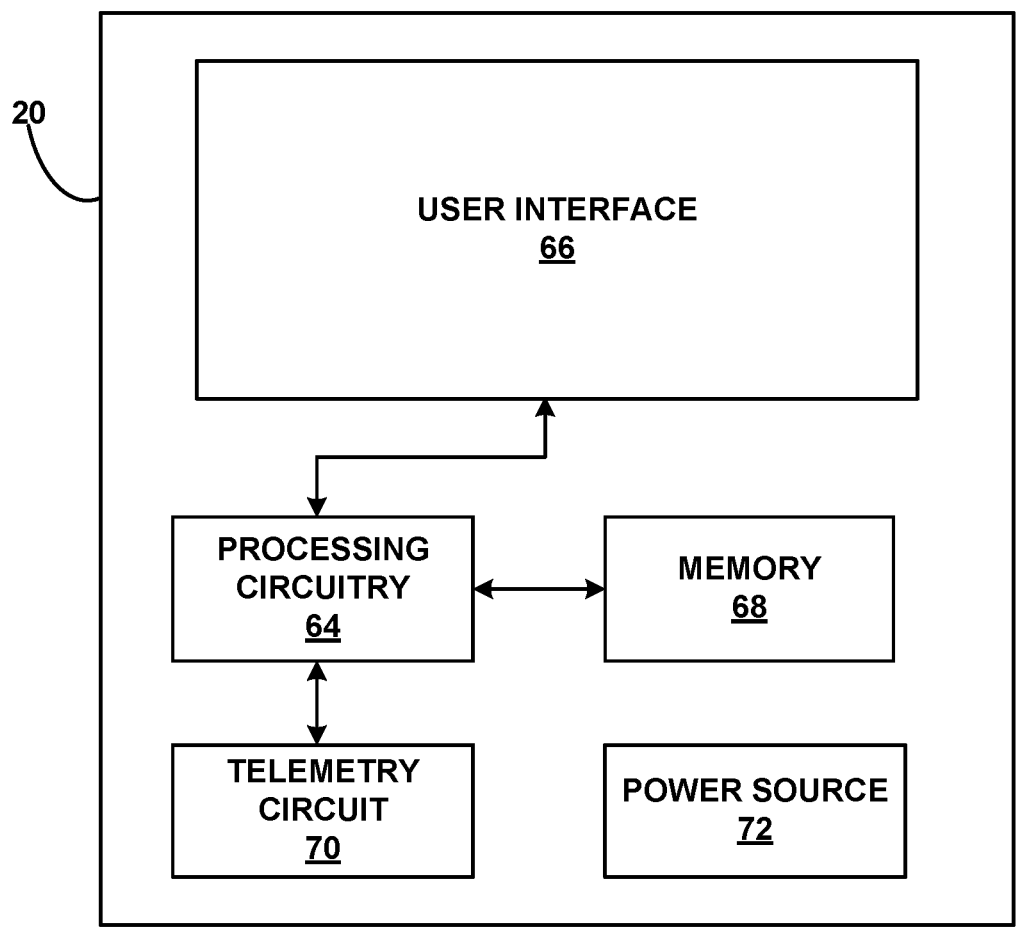
FIG. 4 is a functional block diagram illustrating various components of an external programmer for an implantable medical device.

FIG. 4 is a functional block diagram illustrating various components of an external programmer 20 for IMD 14 or 26. As shown in FIG. 4, external programmer 20 includes processing circuitry 64, memory 68, telemetry circuit 70, user interface 66, and power source 72. External programmer 20 may be embodied as a patient programmer or clinician programmer. A clinician or patient 12 interacts with user interface 66 in order to manually change the stimulation parameters of a program, change programs within a group, turn posture responsive therapy ON or OFF, adjust one or more parameters of the set of posture state definitions, view therapy information, view posture state information, request an update or calibration to posture states, or otherwise communicate with IMD 14 or 26.

User interface 66 may include a screen and one or more input buttons that allow external programmer 20 to receive input from a user. Alternatively, user interface 66 may additionally or only utilize a touch screen display. The screen may be a liquid crystal display (LCD), dot matrix display, organic light-emitting diode (OLED) display, presence sensitive display (e.g., a touch screen), or any other device capable of delivering and/or accepting information. For visible posture state indications, a display screen may suffice. For audible and/or tactile posture state indications, programmer 20 may further include one or more audio speakers, voice synthesizer chips, piezoelectric buzzers, or the like.

Input buttons for user interface 66 may include a touch pad, increase and decrease buttons, emergency shut off button, and other buttons needed to control the stimulation therapy. Processing circuitry 64 controls user interface 66, retrieves data from memory 68 and stores data within memory 68. Processing circuitry 64 also controls the transmission of data through telemetry circuit 70 to IMD 14 or 26. Memory 68 includes operation instructions for processing circuitry 64 and data related to patient therapy. In this manner, user interface 66 may include one or more input devices that receive input from a user and one or more output devices that present information back to the user. In the example of a touch screen device, the touch screen device incorporates both a display as the output device and a touch sensitive (or presence sensitive) input device incorporated with the display. In other examples, user interface 66 may include separate input devices (e.g., buttons, keypads, switches dials, etc.) and one or more output devices (e.g., displays, lights, speakers, haptic devices, etc.).

Telemetry circuit 70 allows the transfer of data to and from IMD 14 or IMD 26. Telemetry circuit 70 may communicate automatically with IMD 14 at a scheduled time or when the telemetry circuit detects the proximity of the stimulator. Alternatively, telemetry circuit 70 may communicate with IMD 14 when signaled by a user through user interface 66. To support RF communication, telemetry circuit 70 may include appropriate electronic components, such as amplifiers, filters, mixers, encoders, decoders, and the like. Power source 72 may be a rechargeable battery, such as a lithium ion or nickel metal hydride battery. Other rechargeable or conventional batteries may also be used. In some cases, external programmer 20 may be used when coupled to an alternating current (AC) outlet, i.e., AC line power, either directly or via an AC/DC adapter.

Figure 5:
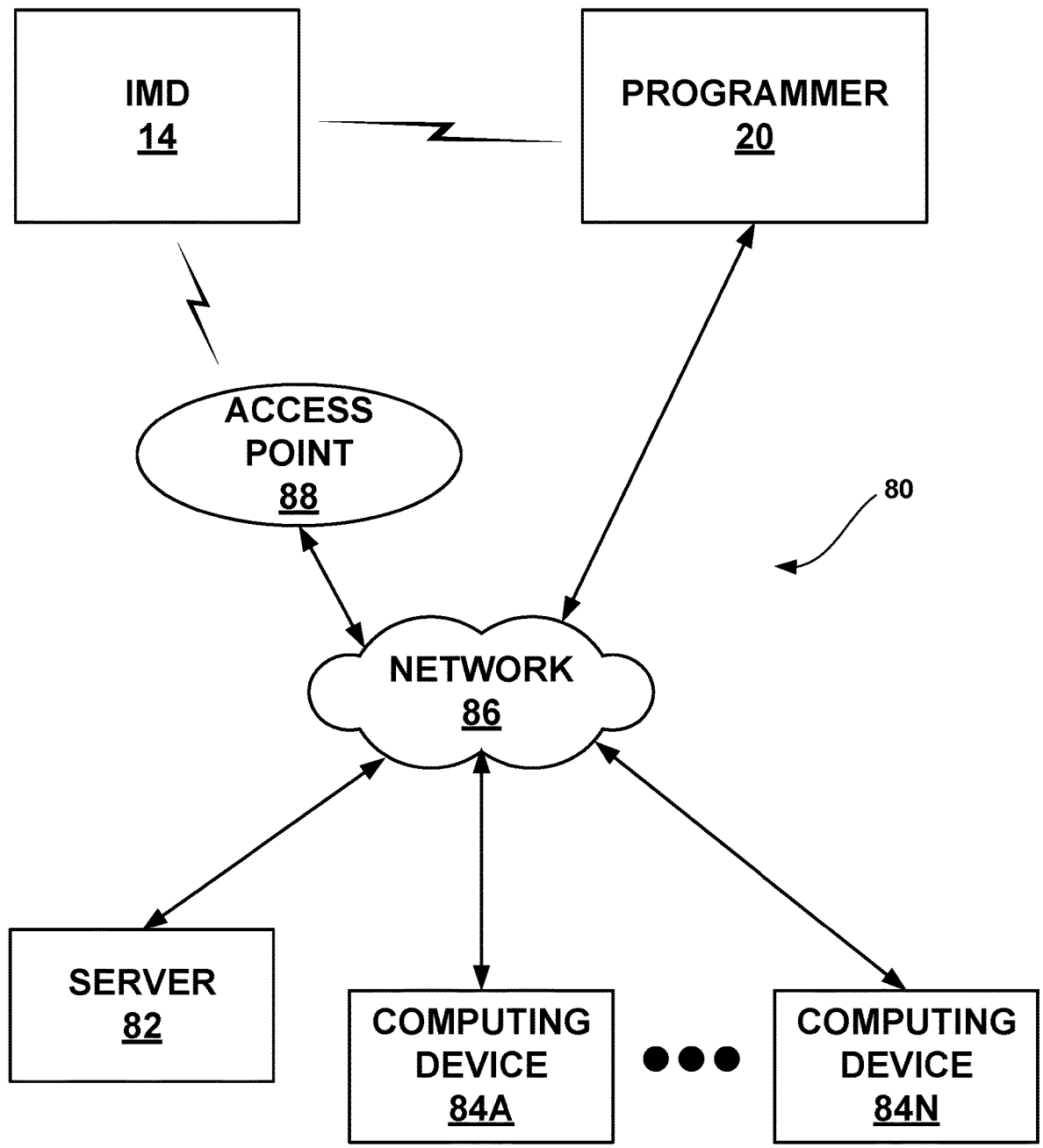
FIG. 5 is a block diagram illustrating an example system that includes an external device, such as a server, and one or more computing devices that are coupled to an implantable medical device and external programmer shown in FIGS. 1A and 1B via a network.

FIG. 5 is a block diagram illustrating an example system 80 that includes an external device, such as a server 82, and one or more computing devices 84A-84N, that are coupled to IMD 14 and external programmer 20 shown in FIGS. 1A-1B via a network 86. In this example, IMD 14 may use its telemetry circuit 88 to communicate with external programmer 20 via a first wireless connection, and to communicate with an access point 88 via a second wireless connection. In other examples, IMD 26 may also be used in place of IMD 14.

In the example of FIG. 5, access point 88, external programmer 20, server 82, and computing devices 84A-84N are interconnected, and able to communicate with each other, through network 86. In some cases, one or more of access point 88, external programmer 20, server 82, and computing devices 84A-84N may be coupled to network 86 through one or more wireless connections. IMD 14, external programmer 20, server 82, and computing devices 84A-84N may each comprise one or more processors, such as one or more microprocessors, digital signal processors (DSPs), application specific integrated circuits (ASICs), field programmable gate arrays (FPGAs), programmable logic circuitry, or the like, that may perform various functions and operations, such as those described in this disclosure.

Access point 88 may comprise a device, such as a home monitoring device, that connects to network 86 via any of a variety of connections, such as telephone dial-up, digital subscriber line (DSL), or cable modem connections. In other examples, access point 88 may be coupled to network 86 through different forms of connections, including wired or wireless connections.

During operation, IMD 14 may collect and store various forms of data. For example, IMD 14 may collect sensed posture state information during therapy delivery that indicate how patient 12 moves throughout each day. In some cases, IMD 14 may directly analyze the collected data to evaluate the patient 12 posture state, such as what percentage of time patient 12 was in each identified posture state. In other cases, however, IMD 14 may send stored data relating to posture state information to external programmer 20 and/or server 82, either wirelessly or via access point 88 and network 86, for remote processing and analysis. For example, IMD 14 may sense, process, trend and evaluate the sensed posture state information. Alternatively, processing, trending and evaluation functions may be distributed to other devices such as external programmer 20 or server 82, which are coupled to network 86. In addition, posture state information may be archived by any of such devices, e.g., for later retrieval and analysis by a clinician.

In some cases, IMD 14, external programmer 20 or server 82 may process posture state information or raw data and/or therapy information into a displayable posture state report, which may be displayed via external programmer 20 or one of computing devices 84A-84N. The posture state report may contain trend data for evaluation by a clinician, e.g., by visual inspection of graphic data. In some cases, the posture state report may include the number of activities patient 12 conducted, a percentage of time patient 12 was in each posture state, the average time patient 12 was continuously within a posture state, what group or program was being used to deliver therapy during each activity, the number of adjustments to therapy during each respective posture state, or any other information relevant to patient 12 therapy, based on analysis and evaluation performed automatically by IMD 14, external programmer 20 or server 82. A clinician or other trained professional may review and/or annotate the posture state report, and possibly identify any problems or issues with the therapy that should be addressed. In some examples, a clinician may transmit a request to IMD 14 to update the posture state definitions from computing device 84A via network 84 and/or programmer 20.

In some cases, server 82 may be configured to provide a secure storage site for archival of posture state information that has been collected from IMD 14 and/or external programmer 20. Network 86 may comprise a local area network, wide area network, or global network, such as the Internet. In some cases, external programmer 20 or server 82 may assemble posture state information in web pages or other documents for viewing by trained professionals, such as clinicians, via viewing terminals associated with computing devices 84A-84N. System 80 may be implemented, in some aspects, with general network technology and functionality similar to that provided by the Medtronic CareLink® Network developed by Medtronic, Inc., of Minneapolis, MN.

Although some examples of the disclosure may involve posture state information and data, system 80 may be employed to distribute any information relating to the treatment of patient 12 and the operation of any device associated therewith. For example, system 80 may allow therapy errors or device errors to be immediately reported to the clinician. In addition, system 80 may allow the clinician to remotely intervene in the therapy and reprogram IMD 14, patient programmer 30, or communicate with patient 12. In an additional example, the clinician may utilize system 80 to monitor multiple patients and share data with other clinicians in an effort to coordinate rapid evolution of effective treatment of patients.

Furthermore, although the disclosure is described with respect to SCS therapy, such techniques may be applicable to IMDs that convey other therapies in which posture state information is important, such as, e.g., DBS, pelvic floor stimulation, gastric stimulation, occipital stimulation, functional electrical stimulation, and the like. Also, in some aspects, techniques for evaluating posture state information, as described in this disclosure, may be applied to IMDs that provide other therapy (e.g., drug pumps) or IMDs that are generally dedicated to sensing or monitoring and do not include stimulation or other therapy components.

Figure 6A:
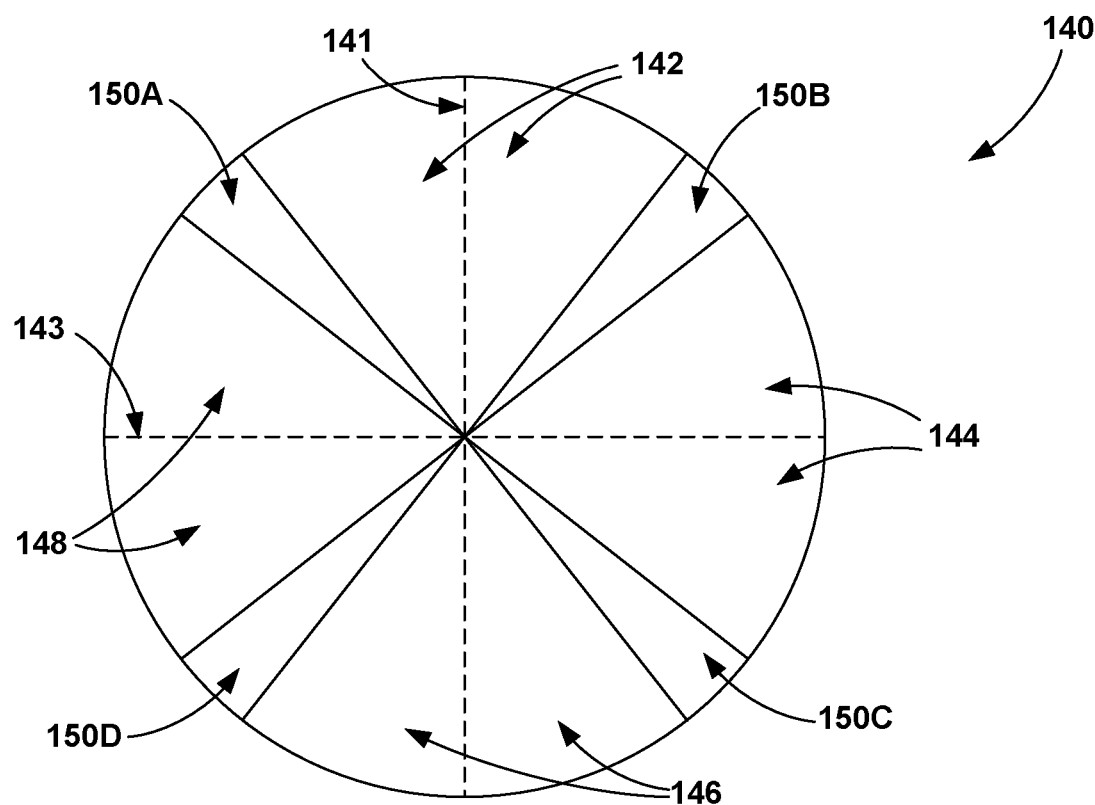
FIGS. 6A-6C are conceptual illustrations of example posture state spaces within which postures state reference data may define the posture state of a patient.
Figure 6B:
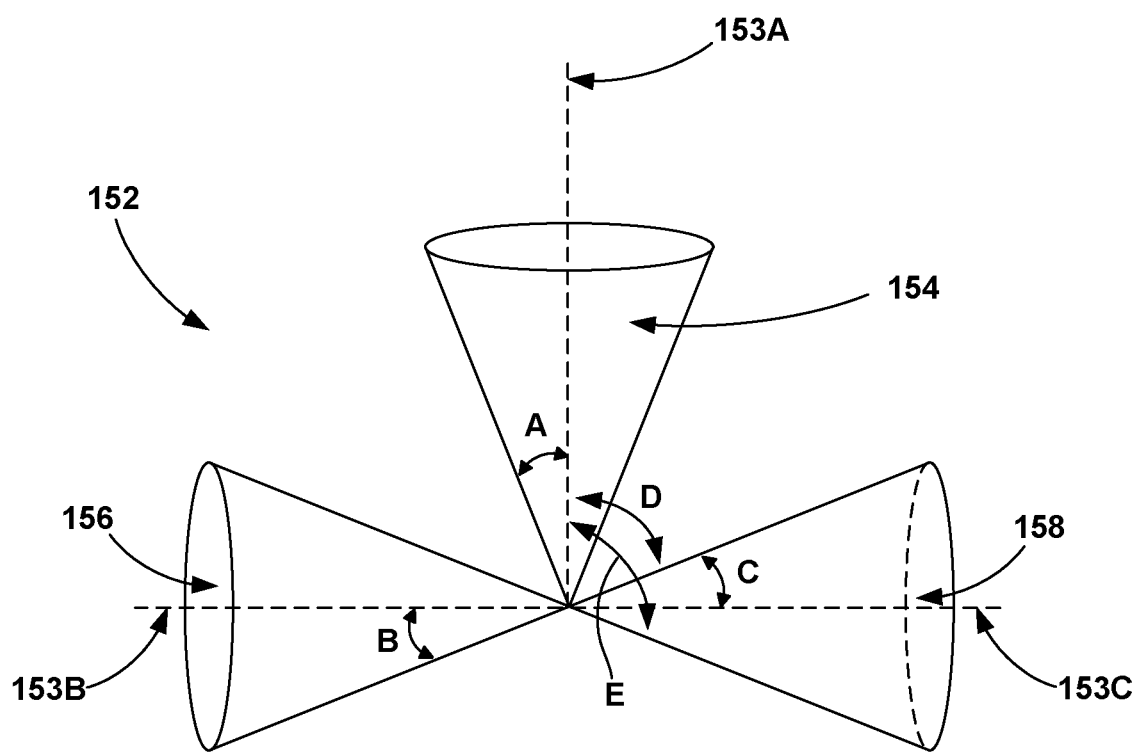
Figure 6C:
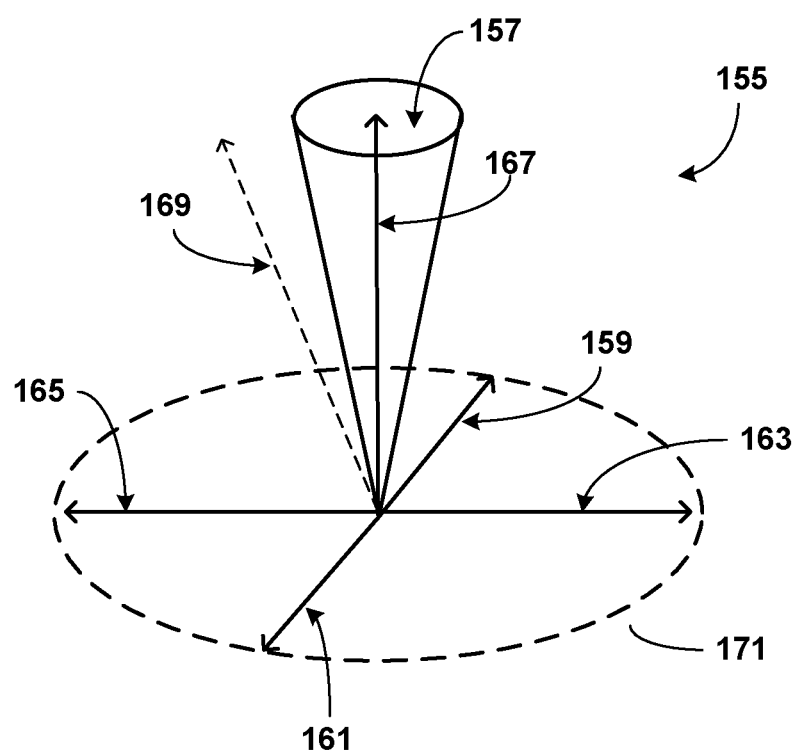

FIGS. 6A-6C are conceptual illustrations of posture state spaces 140, 152, 155, respectively, within which posture state reference data may define the posture state of patient 12. Posture state reference data may define certain regions associated with particular posture states of patient 12 within the respective posture state spaces 140, 152, 155. The output of one or more posture state sensors may be analyzed by posture state module 46 with respect to posture state spaces 140, 152, 155 to determine the posture state of patient 12. For example, if the output of one or more posture state sensors is within a particular posture region defined by posture state reference data (i.e., one or more posture state definitions that define respective posture regions), posture state module 46 may determine that patient 12 is within the posture state associated with the respective posture state region. The posture state definitions may define respective posture states within each posture state space.

In some cases, one or more posture state regions (e.g., different posture states) may be defined as posture state cones. Posture state cones may be used to define a posture state of patient 12 based on the output from a posture state sensor of a posture state according to an example method for posture state detection. A posture state cone may be centered about a posture state reference coordinate vector that corresponds to a particular posture state. In the examples of FIGS. 6A and 6B, the posture state module 46 of IMD 14 or IMD 26 may use a posture state sensor, e.g., a three-axis accelerometer that provides data indicating the posture state of patient 12, to sense posture vectors. While the sensed data may be indicative of any posture state, postures of patient 12 will generally be used below to illustrate the concept of posture cones. As shown in FIG. 6A, posture state space 140 represents a vertical plane dividing patient 12 from left and right sides, or the sagittal plane. A posture state parameter value from two axes of the posture state sensor may be used to determine the current posture state of patient 12 according to the posture state space 140. The posture state data may include x, y and z coordinate values.

A posture cone may be defined by a reference coordinate vector for a given posture state in combination with a distance or angle defining a range of coordinate vectors within a cone surrounding the posture reference coordinate vector (e.g., as part of a posture state definition). Alternatively, a posture cone may be defined by a reference coordinate vector and a range of cosine values computed using the reference coordinate vector as an adjacent vector and any of the outermost vectors of the cone as a hypotenuse vector. If a sensed posture state vector is within an applicable angle or distance of the reference coordinate vector, or if the sensed posture state vector and the reference coordinate vector produce a cosine value in a specified cosine range, then posture state vector is determined to reside within the posture cone defined by the reference coordinate vector.

Posture state space 140 is segmented into different posture cones that are indicative of a certain posture state of patient 12. In the example of FIG. 6A, upright cone 142 indicates that patient 12 is sitting or standing upright, lying back cone 148 indicates that patient 12 is lying back down, lying front cone 144 indicates that patient 12 is lying chest down, and inverted cone 146 indicates that patient 12 is in an inverted position. Other cones may be provided, e.g., to indicate that patient 12 is lying on the right side or left side. For example, a lying right posture cone and a lying left posture cone positioned outside of the sagittal plane illustrated in FIG. 6A. In particular, the lying right and lying left posture cones may be positioned in a coronal plane substantially perpendicular to the sagittal plane illustrated in FIG. 6A. For ease of illustration, lying right and lying left cones are not shown in FIG. 6A.

Vertical axis 141 and horizontal axis 143 are provided for orientation of posture state area 140, and are shown as orthogonal for purposes of illustration. However, posture cones may have respective posture reference coordinate vectors that are not orthogonal in some cases. For example, individual reference coordinate vectors for cones 142 and 146 may not share the same axis, and reference coordinate vectors for cones 144 and 148 may not share the same axis. Also, reference coordinate vectors for cones 144 and 148 may or may not be orthogonal to reference coordinates vectors for cones 142, 146. Therefore, although orthogonal axes are shown in FIG. 6A for purposes of illustration, respective posture cones may be defined by individualized reference coordinate vectors for the cones.

IMD 14 may monitor the posture state parameter value of the posture state sensor to produce a sensed coordinate vector and identify the current posture of patient 12 by identifying which cone the sensed coordinated vector of the posture state sensor module 46 resides. For example, if the posture state parameter value corresponds to a sensed coordinate vector that falls within lying front cone 144, IMD 14 determines that patient 12 is lying down on their chest. IMD 14 may store this posture information as a determined posture state or as raw output from the posture state sensor, change therapy according to the posture, or both. Additionally, IMD 14 may communicate the posture information to programmer 20 so that the patient programmer can present a posture state indication to patient 12.

In addition, posture state area 140 may include hysteresis zones 150A, 150B, 150C, and 150D (collectively "hysteresis zones 150"). Hysteresis zones 150 are positions within posture state area 140 where no posture cones have been defined. Hysteresis zones 150 may be particularly useful when IMD 14 utilizes the posture state information and posture cones to adjust therapy automatically. If the posture state sensor indicates that patient 12 is in upright cone 142, IMD 14 would not detect that patient 12 has entered a new posture cone until the posture state parameter value indicates a different posture cone. For example, if IMD 14 determines that patient 12 moves to within hysteresis zone 150A from upright cone 142, IMD 14 retains the posture as upright. In this manner, IMD 14 does not change the corresponding therapy until patient 12 fully enters a different posture cone. Hysteresis zones 150 prevent IMD 14 from continually oscillating between different therapies when patient 12's posture state resides near a posture cone boundary.

Each posture cone 142, 144, 146, 148 may be defined by an angle in relation to a reference coordinate vector defined for the respective posture cone. Alternatively, some posture cones may be defined by an angle relative to a reference coordinate vector for another posture cone. For example, lying postures may be defined by an angle with respect to a reference coordinate vector for an upright posture cone. In each case, as described in further detail below, each posture cone may be defined by an angle in relation to a reference coordinate posture vector defined for a particular posture state. The reference coordinate vector may be defined based on posture sensor data generated by a posture state sensor while patient 12 occupies a particular posture state desired to be defined using the reference coordinate vector. For example, a patient may be asked to occupy a posture so that a reference coordinate vector can be sensed for the respective posture. In this manner, vertical axis 141 may be specified according to the patient's actual orientation. Then, a posture cone can be defined using the reference coordinate vector as the center of the cone.

Vertical axis 141 in FIG. 6A may correspond to a reference coordinate vector sensed while the patient was occupying an upright posture state. Similarly, a horizontal axis 143 may correspond to a reference coordinate vector sensed while the patient is occupying a lying posture state. A posture cone may be defined with respect to the reference coordinate vector. Although a single axis is shown extending through the upright and inverted cones 142, 146, and another single axis is shown extending through the lying down and lying up cones 144, 148, individual reference coordinate vectors may be used for respective cones, and the reference coordinate vectors may not share the same axes, depending on differences between the reference coordinate vectors obtained for the posture cones.

Posture cones may be defined by the same angle or different angles, symmetrical to either axis, or asymmetrical to either axis. For example, upright cone 142 may have an angle of eighty degrees, +40 degrees to −40 degrees from the positive vertical axis 141. In some cases, lying cones may be defined relative to the reference coordinate vector of the upright cone 142. For example, lying up cone 148 may have an angle of eighty degrees, −50 degrees to −130 degrees from the positive vertical axis 141. Inverted cone 146 may have an angle of eighty degrees, −140 degrees to +140 degrees from vertical axis 141. In addition, lying down cone 144 may have an angle of eighty degrees, +50 degrees to +130 degrees from the positive vertical axis 141. In other examples, each posture cone may have varying angle definitions, and the angles may change during therapy delivery to achieve the most effective therapy for patient 12.

Alternatively, or additionally, instead of an angle, posture cones 144, 146, 148, 148 may be defined by a cosine value or range of cosine values in relation to vertical axis 141, horizontal axis 143, or some other axis, such as, e.g., individual reference coordinate vectors for the respective cones. For example, a posture cone may be defined by a cosine value that defines the minimum cosine value, calculated using a reference coordinate vector and a respective coordinate vector sensed by a posture state sensor at any point in time. In the cosine computation, the value (adjacent/hypotenuse) can be computed using the magnitude of the coordinate reference vector as the adjacent and a vector at the outermost extent of the cone as the hypotenuse to define a range of cosine values consistent with the outer bound of the cone. In any case, the posture state definition for any respective posture state may include one or more of these values to determine where in space the posture state resides.

For upright cone 142, the cosine range may extend from the maximum cosine value of 1.0, corresponding to a sensed vector that matches the reference coordinate vector of the upright cone, to a minimum cosine value that corresponds to a sensed vector at the outer limit of the upright cone. As another example, for lying cone 144, the cosine range may extend from the maximum cosine value of 1.0, corresponding to a sensed vector that matches the reference coordinate vector of the lying cone, to a minimum cosine value that corresponds to a sensed vector at the outer limit of the lying cone. Alternatively, the lying cone 144 may be defined with reference to the upright cone 142, such that the cosine range may extend between a maximum and minimum values determined relative to the reference coordinate vector for the upright cone.

In other examples, posture state area 140 may include additional posture cones than those shown in FIG. 6A. For example, a reclining cone may be located between upright cone 142 and lying back cone 148 to indicate when patient 12 is reclining back (e.g., in a dorsal direction). In this position, patient 12 may need a different therapy to effectively treat symptoms. Different therapy programs may provide efficacious therapy to patient 12 when patient 12 is in each of an upright posture (e.g., within upright cone 142), lying back posture (e.g., within lying back cone 148), and a reclining back posture. Thus, a posture cone that defines the reclining back posture may be useful for providing efficacious posture-responsive therapy to patient 12. The reclining back posture may be spatially located between the lying back cone 148 and upright cone 142 in some examples. In other examples, posture state area 140 may include fewer posture cones than cones 142, 144, 146, 148 shown in FIG. 6A. For example, inverted cone 146 may be replaced by a larger lying back cone 148 and lying front cone 144.

FIG. 6B illustrates an example posture state space 152 that is a three-dimensional space in which the posture state parameter value from the posture state sensor is placed in relation to the posture cones. Posture state space 152 is substantially similar to posture state area 140 of FIG. 6A. However, the posture state parameter value derived from all three axes of a 3-axis accelerometer may be used to accurately determine the posture state of patient 12. In the example of FIG. 6B, posture state space 152 includes upright cone 154, lying back cone 156, and lying front cone 158 (each of which are defined by respective posture state definitions). Posture state space 152 also includes hysteresis zones (not shown) similar to those of posture state area 140. In the example of FIG. 6B, the hysteresis zones are the spaces not occupied by a posture cone, e.g., upright cone 154, lying back cone 156, and lying front cone 158.

Posture cones 154, 156 and 158 also are defined by a respective center line 153A, 153B, or 153C, and associated cone angle A, B or C. For example, upright cone 154 is defined by center line 153A that runs through the center of upright cone 154. Center line 153A may correspond to an axis of the posture state sensor or some other calibrated vector. In some embodiments, each center line 153A, 153B, 153C may correspond to a posture reference coordinate vectors defined for the respective postures, e.g., the upright posture. For instance, assuming that patient 12 is standing, the DC portion of the x, y, and z signals detected by the posture state sensor of posture state module 46 define a posture vector that corresponds to center line 153A.

The x, y, and z signals may be measured while patient 12 is known to be in a specified position, e.g., standing, and the measured vector may be correlated with the upright posture state, such as during an initial calibration routine. Thereafter, when the DC portions of the posture state sensor signal are within some predetermined cone tolerance or proximity, e.g., as defined by an angle, distance or cosine value, of the posture reference coordinate vector (i.e., center line 153A), it may be determined that patient 12 is in the upright posture. In this manner, a sensed posture coordinate vector may be initially measured based on the output of one or more posture state sensors of posture state module 46, associated with a posture state, such as upright, as a reference coordinate vector, and then later used to detect a patient's posture state.

As previously indicated, it may be desirable to allow some tolerance to be associated with a defined posture state, thereby defining a posture cone or other volume. For instance, in regard to the upright posture state, it may be desirable to determine that a patient who is upright but leaning slightly is still in the same upright posture state. Thus, the definition of a posture state may generally include not only a posture reference coordinate vector (e.g., center line 153A), but also a specified tolerance. One way to specify a tolerance is by providing an angle, such as cone angle A, relative to coordinate reference vector 153A, which results in posture cone 154 as described herein. Cone angle A is the deflection angle, or radius, of upright cone 154. The total angle that each posture cone spans is double the cone angle. The cone angles A, B, and C may be generally between approximately 1 degree and approximately 70 degrees. In other examples, cone angles A, B, and C may be between approximately 10 degrees and 30 degrees. In the example of FIG. 6B, cone angles A, B, and C are approximately 20 degrees. Cone angles A, B, and C may be different, and center lines 153A, 153B, and 153C may not be orthogonal to each other.

In some examples, a tolerance may be specified by a cosine value or range of cosine values. The use of cosine values, in some cases, may provide substantial processing efficiencies. As described above, for example, a minimum cosine value, determined using the reference coordinate vector as adjacent and sensed coordinate vector as hypotenuse, indicates the range of vectors inside the cone. If a sensed coordinate vector, in conjunction with the reference coordinate vector for a posture cone, produces a cosine value that is less than the minimum cosine value for the posture cone, the sensed coordinate vector does not reside within the pertinent posture cone. In this manner, the minimum cosine value may define the outer bound of a range of cosine values within a particular posture cone defined in part by a reference coordinate vector.

While center lines 153A, 153B, 153C of each of the posture cones 154, 156, 158, respectively, are shown in FIG. 6B as being substantially orthogonal to each other, in other examples, center lines 153A, 153B, and 153C may not be orthogonal to each other. Again, the relative orientation of center lines 153A, 153B, 153C may depend on the actual reference coordinate vector output of the posture state sensor of posture state module 46 of IMD 14 when patient 12 occupies the respective postures.

In some cases, all of the posture cones may be individually defined based on actual reference coordinate vectors, where the reference coordinate vectors may be or included as part of one or more posture state definitions. Alternatively, in some cases, some posture cones may be defined with reference to one or more reference coordinate vectors for one or more other posture cones. For example, lying reference coordinate vectors could be assumed to be orthogonal to an upright reference coordinate vector. Alternatively, lying reference coordinate vectors could be individually determined based on sensed coordinate vectors when the patient is in respective lying postures. Hence, the actual reference coordinate vectors for different postures may be orthogonal or non-orthogonal with respect to one another.

In addition to upright cone 154, lying back cone 156, and lying front cone 158, posture state space 152 may include additional posture cones. For example, a lying right cone may be provided to define a patient posture in which patient 12 is lying on his right side and a lying left cone may be provided to define a patient posture in which patient 12 is lying on his left side. In some cases, the lying right cone and lying left cone may be positioned approximately orthogonal to upright cones 154, in approximately the same plane as lying back cone 156 and lying front cone 158. Moreover, posture state space 152 may include an inverted cone positioned approximately opposite of upright cone 154. Such a cone indicates that the patient's posture is inverted from the upright posture, i.e., upside down.

In some examples, to detect the posture state of a patient, posture state module 46 of IMD 14 may determine a sensed coordinate vector based on the posture sensor data generated by one or more posture state sensors, and then analyze the sensed coordinate vector with respect to posture cones 154, 156, 158 of FIG. 6B. For example, in a case in which a posture cone is defined by a reference coordinate vector and a tolerance angle, e.g., tolerance angle "A," posture state module 46 may determine whether the sensed coordinate vector is within upright posture cone 154 by calculating the angle between the sensed coordinate vector and reference coordinate vector, and then determine whether the angle is less than the tolerance angle "A." If so, posture state module 46 determines that the sensed coordinate vector is within upright posture cone 154 and detects that patient 12 is in the upright posture. If posture state module 46 determines that sensed coordinate vector is not within upright posture cone 154, posture state module 46 detects that patient 12 is not in the upright posture.

Posture state module 46 may analyze the sensed coordinate vector in posture state space 152 with respect to each individual defined posture cone, such as posture cones 156 and 158, in such a manner to determine the posture state of patient 12. For example, posture state module 46 may determine the angle between the sensed coordinate vector and reference coordinate vector of individual posture cones defined for the posture state, and compare the determined angle to the tolerance angle defined for the respective posture cone. In this manner, a sensed coordinate vector may be evaluated against each posture cone until a match is detected, i.e., until the sensed coordinate vector is found to reside in one of the posture cones. Hence, a cone-by-cone analysis is one option for posture detection.

In other examples, different posture detection analysis techniques may be applied. For example, instead of testing a sensed coordinate vector against posture cones on a cone-by-cone basis, a phased approach may be applied where the sensed coordinate vector is classified as either upright or not upright. In this case, if the sensed coordinate vector is not in the upright cone, posture state module 46 may determine whether the sensed coordinate vector is in a lying posture, either by testing the sensed coordinate vector against individual lying posture cones or testing the sensed coordinate vector against a generalized lying posture volume, such as a donut- or toroid-like volume that includes all of the lying postures, and may be defined using an angle or cosine range relative to the upright vector, or relative to a modified or virtual upright vector as will be described. In some cases, if lying postures are defined by cones, the lying volume could be defined as a logical OR of the donut- or toroid-like volume and the volumes of the lying posture cones. If the cones are larger such that some portions extend beyond the lying volume, then those portions can be added to the lying volume using the logical OR-like operation.

If the sensed coordinate vector resides within the donut- or toroid-like lying volume, then the sensed coordinate vector may be tested against each of a plurality of lying posture cones in the lying volume. Alternatively, the posture detection technique may not use lying cones. Instead, a posture detection technique may rely on a proximity test between the sensed coordinate vector and each of the reference coordinate vectors for the respective lying postures. The proximity test may rely on angle, cosine value or distance to determine which of the lying posture reference coordinate vectors is closest to the sensed coordinate vector. For example, the reference coordinate vector that produces the largest cosine value with the sensed coordinate vector as hypotenuse and the reference coordinate vector as adjacent is the closest reference coordinate vector. In this case, the lying posture associated with the reference coordinate vector producing the largest cosine value is the detected posture. Hence, there are a variety of ways to detect posture, such as using posture cones, using an upright posture cone with lying volume and lying posture cone test, or using an upright posture cone with lying volume and lying vector proximity test.

As a further illustration of an example posture detection technique, posture state module 46 may first determine whether patient 12 is generally in a lying posture state or upright posture state by analyzing the sensed coordinate vector in posture state space 152 with respect to an axis 153A for the upright posture state. Axis 153A may correspond to the upright reference coordinate vector. For example, angle "A" may be used to define upright posture cone 154, as described above, and angles "D" and "E" may be used to define the vector space in which patient 12 may be generally considered to be in the lying posture state, regardless of the particular posture state cone, e.g., lying front cone 158, lying back cone 156, lying right cone (not shown), or lying left cone (not shown), in which the sensed coordinate vector falls.

If it is determined that a sensed coordinate vector is not within an angle A of the axis 153A, then it may be determined that the patient is not in the upright posture indicated by the upright posture cone. In this case, it may next be determined whether a sensed coordinated vector is generally in a lying posture space volume, which may be considered somewhat donut- or toroid-like, and may be defined relative to the upright reference coordinate vector 153A. As shown, angles "D" and "E" define the minimum and maximum angle values, respectively, that a sensed vector may form with respect to axis 153A of patient 12 for a determination to be made that the patient is generally in the lying posture state. Again, cosine values may be used instead of angles to determine the positions of sensed coordinate vectors relative to posture cones or other posture volumes, or relative to reference coordinate vectors.

As illustrated, angles "D" and "E" may be defined with respect to vertical axis 153A (which may correspond to an upright reference coordinate vector), which is the reference coordinate vector for the upright posture cone, rather than with respect to a reference coordinate vector of a lying posture state cone. If a sensed vector is within the angular range of D to E, relative to axis 153A, then it can be determined by posture state module 46 that the patient is generally in a lying posture. Alternatively, in some examples, an angle C could be defined according to a generally horizontal axis 153C (which may correspond to one of the lying reference coordinate vectors). In this case, if a sensed vector is within angle C of axis 153C, it can be determined by posture state module 46 that the patient is in a lying posture. In each case, the region generally defining the lying posture state may be referred to as a posture donut or posture toroid, rather than a posture cone. The posture donut may generally encompass a range of vectors that are considered to be representative of various lying down postures.

As an alternative, posture state module 46 may rely on cosine values or a range of cosine values to define the posture donut or toroid with respect to axis 153A. When the sensed vector falls within the vector space defined by axis 153A and angles "D" and "E", or produces a cosine value with the reference coordinate vector 153A in a prescribed range, posture state module 46 may determine that patient 12 is generally in a lying posture state. For example, if the sensed vector and reference coordinate vector 153 produce a cosine value in a first range, the posture is upright. If the cosine value is in a second range, the posture is lying. If the cosine value is outside of the first and second ranges, the posture may be indeterminate. The first range may correspond to the range of cosine values that would be produced by vectors in posture cone 154 defined by angle A, and the second range may be correspond to cosine values that would be produced by vectors in the posture donut defined by angles D and E.

When the sensed vector fall within the vector space defined by axis 153A and angles "D" and "E", as indicated by angle or cosine value, posture state module 46 may then determine the particular lying posture state occupied by patient 12, e.g., lying front, lying back, lying right, or lying left. To determine the particular lying posture state occupied by patient 12, posture state module 46 may analyze the sensed vector with respect to reference coordinate vectors for individual lying posture state cones, e.g., lying front cone 156, lying back cone 158, lying right cone (not shown), and lying left cone (not shown), using one or more techniques previously described, such as angle or cosine techniques. For example, posture state module 46 may determine whether the sensed coordinated vector resides within one of the lying posture state cones and, if so, select the posture state corresponding to that cone as the detected posture state.

In any of these examples, IMD 14 may update the posture state definitions that define each of the posture states (e.g., each posture cone) using the difference between sensed posture data and one or more aspects of the posture state definition that defines the posture state that the patient was in when the posture data was generated. For example, IMD 14 may determine that the angle between the vector of the sensed posture data is 20 degrees counter-clockwise from vector 153A of posture cone 154. IMD 14 may then apply the 20 degree change to each of vectors 153A, 153B, and 153C of respective posture cones 154, 156, and 158. In this manner, IMD 14 would shift all of the posture cones the same magnitude in space based on the determined difference for the one posture state and sensed posture data. Instead of angles, IMD 14 may determine differences in x, y, and z components for each vector and perform similar adjustments to shift all of the posture states by updating all of the posture state definitions.

FIG. 6C illustrates an example posture state space 155 that is a three-dimensional space substantially similar to posture state space 152 of FIG. 6B. Posture state space 155 includes upright posture cone 157 defined by reference coordinate vector 167. The tolerance that defines upright posture cone 157 with respect to reference coordinate vector 167 may include a tolerance angle or cosine value, as described above. In contrast to determining whether a sensed coordinate vector resides in a lying cone, FIG. 6C illustrates a method for detecting a lying posture based on proximity of a sensed coordinate vector to one of the reference coordinate vectors for the lying postures.

As shown in FIG. 6C, posture state space 155 includes four reference coordinate vectors 159, 161, 163, 165, which are associated with lying left, lying right, lying front, and lying back posture states, respectively. Posture state module 46 may have defined each of the four reference coordinated vector 159, 161, 163, 165 based on the output of one or more posture sensors while patient 12 occupied each of the corresponding posture states. Unlike lying front and lying back posture cones 158, 156 in the example of FIG. 6B, the posture state reference data (i.e., one or more posture state definitions) for the four defined posture states corresponding to reference vectors 159, 161, 163, 165 need not include angles defined relative to the respective reference vector in a manner that defines a posture cone. Rather, as will be described below, the respective posture state reference vectors may be analyzed with respect to one another in terms of cosine values to determine which particular reference coordinate vector is nearest in proximity to a sensed coordinate vector.

In some examples, to determine the posture state of patient 12, posture state module 46 may determine whether a sensed coordinate vector is within upright posture cone 157 by analyzing the sensed coordinate vector in view of the tolerance angle or cosine value(s) defined with respect to upright posture reference coordinate vector 167, or whether the sensed vector is within a posture donut or toroid defined by a range of angles (as in FIG. 6B) or cosine values with respect to upright posture reference coordinate vector 167, in which case posture state module 46 may determine that patient 12 is in a general lying posture state.

If posture state module 46 determines that patient 12 is occupying a general lying posture state, posture state module 46 may then calculate the cosine value of the sensed coordinate vector with respect to each lying reference coordinate vectors 159, 161, 163, 165. In such a case, posture state module 46 determines the particular lying posture state of patient 12, i.e., lying left, lying right, lying front, lying back, based on which cosine value is the greatest of the four cosine values. For example, if the cosine value calculated with the sensed vector as the hypotenuse and the lying front reference vector 163 as the adjacent vector is the largest value of the four cosine values, the sensed vector may be considered closest in proximity to lying front reference vector out of the four total reference vectors 159, 161, 163, 165. Accordingly, posture state module 46 may determine that patient 12 is occupying a lying front posture state.

In some examples, posture state module 46 may determine whether patient 12 is generally in a lying posture state based on the relationship of a sensed vector to upright reference vector 167. For example, as described above, a lying posture donut or toroid may be defined with respect to upright posture reference vector 167, e.g., using angles D and E as in FIG. 6B. Such a technique may be appropriate when lying posture reference vectors 159, 161, 163, 165 define a common plane substantially orthogonal to upright posture reference vector 167. However, the lying posture reference vectors 159, 161, 163, 165 may not in fact be orthogonal to the upright reference coordinate vector 167. Also, the lying posture reference vectors 159, 161, 163, 165 may not reside in the same plane.

To account for non-orthogonal reference vectors, in other examples, a lying posture donut or toroid may be defined with respect to a modified or virtual upright reference vector 169 rather than that actual upright posture reference vector 167. Again, such a technique may be used in situations in which the lying reference vectors 159, 161, 163, 165 are not in a common plane, or the common plane of reference vector 159, 161, 163, 165 is not substantially orthogonal to upright reference vector 167. However, use of the example technique is not limited to such situations.

To define virtual upright reference vector 169, posture state module 46 may compute the cross-products of various combinations of lying reference vectors 159, 161, 163, 165 and average the cross product values. In the example of FIG. 6C, posture state module 46 may compute four cross products and average the four cross product vectors to yield the virtual upright vector. The cross product operations that may be performed are: lying left vector 159$x$ lying back vector 165, lying back vector 165$x$ lying right vector 161, lying right vector 161$x$ lying front vector 163, and lying front vector 163$x$ lying left vector 159. Each cross product yields a vector that is orthogonal to the two lying reference vectors that were crossed. Averaging each of the cross product vectors yields a virtual upright reference vector that is orthogonal to lying plane 171 approximately formed by lying reference vectors 159, 161, 163, 165.

Using virtual upright reference vector 169, posture state module 46 may define a lying posture donut or toroid in a manner similar to that described with respect to upright reference vector 167, but instead with respect to virtual upright reference vector 169. In particular, when posture state module 46 determines that the patient is not in the upright posture, the posture state module determines whether the patient is in a lying posture based on an angle or cosine value with respect to the virtual upright reference vector 169.

Posture state module 46 may still determine whether patient 12 is in an upright posture state using upright posture cone 157. If posture state module 46 determines that patient 12 is occupying a general lying posture state based on the analysis of the sensed coordinate vector with respect to virtual upright reference vector 169, posture state module 46 may then calculate the cosine value of the sensed coordinate vector (as hypotenuse) with respect to each lying reference coordinate vectors 159, 161, 163, 165 (as adjacent).

In such a case, posture state module 46 determines the particular lying posture state of patient 12, i.e., lying left, lying right, lying front, lying back, based on which cosine value is the greatest of the four cosine values. For example, if the cosine value calculated with the lying front reference vector 163 is the largest value of the four cosine values, the sensed vector may be considered closest in proximity to lying front reference vector out of the four total reference vectors 159, 161, 163, 165. Accordingly, posture state module 85 may determine that patient 12 is occupying a lying front posture state. As described herein, IMD 14 may update the posture state definitions for each lying posture state and upright posture state based on a single difference between the sensed posture data and the posture state definition for the one posture state that the patient resided in when the sensed posture data was generated.

Additionally, posture state definitions are not limited to posture cones. For example, a definition of a posture state may involve a posture vector and a tolerance, such as a maximum distance from the posture vector. So long as a detected posture vector is within this maximum distance from the posture vector that is included in the definition of the posture state, patient 12 may be classified as being in that posture state. This alternative method may allow posture states to be detected without calculating angles, as is exemplified above in the discussion related to posture cones.

Further to the foregoing, posture states may be defined that are specific to a particular patient's activities and/or profession. For instance, a bank teller may spend a significant portion of his working day leaning forward at a particular angle. A patient-specific "Leaning Forward" posture state including this angle may be defined. The cone angle or other tolerance value selected for this posture state may be specific to the particular posture state definition for this patient. In this manner, the defined posture states may be tailored to a specific user, and need not be "hard-coded" in the IMD.

In some examples, individual posture states may be linked together, thereby tying posture states to a common set of posture reference data and a common set of therapy parameter values. This may, in effect, merge multiple posture cones for purposes of posture state-based selection of therapy parameter values. For example, all lying posture state cones (back, front, left, right) could be treated as one cone or a donut/toroid, e.g., using a technique the same as or similar to that described with respect to FIGS. 6B and 6C to define a donut, toroid or other volume. One program group or common set of therapy parameter values may apply to all posture states in the same merged cone, according to the linking status of the posture states, as directed via external programmer 20.

Merging posture cones or otherwise linking a plurality of posture states together may be useful for examples in which a common set of therapy parameter values provides efficacious therapy to patient 12 for the plurality of posture states. In such an example, linking a plurality of posture states together may help decrease the power consumption required to provide posture-responsive therapy to patient 12 because the computation required to track patient posture states and provide responsive therapy adjustments may be minimized when a plurality of posture states are linked together.

Linking of posture states also may permit a therapy parameter value adjustment in one posture state to be associated with multiple posture states at the same time. For example, the same amplitude level for one or more programs may be applied to all of the posture states in a linked set of posture states. Alternatively, the lying down posture states may all reside within a "donut" or toroid that would be used instead of separate comes 156 and 158, for example. The toroid may be divided into sectional segments that each correspond to different posture states, such as lying (back), lying (front), lying (right), lying (left) instead of individual cones. In this case, different posture reference data and therapy parameter values may be assigned to the different sectional segments of the toroid.

A clinician may initially orient or calibrate one or more sensors of posture state module 46. For example, as prompted by clinician programmer 60, a clinician may instruct patient 12 to occupy a specified posture, e.g., standing, so that posture state module 46 may sense a reference coordinate vector for the respective posture. The clinician may provide an indication that patient 12 is in the specified posture. In response to the indication from the clinician, a vector measured by posture state module 46 may be stored, e.g., in memory 42 of IMB 14, as a reference coordinate vector. The clinician may repeat this process with various specified postures, e.g., lying back or lying front and lying left or lying right. The orientation process may yield a set of reference coordinate vectors. These posture state reference coordinate vectors may be associated with posture state definitions and used to classify the posture of patient 12 within a posture state. In some cases, the reference coordinate vectors may be used by one or more posture state definitions to define respective postures in space. In this manner, each posture statue definition for a posture may include at least one reference coordinate vector that at least partially defines the posture. If a reference vector is used to device an edge of a posture in space, several posture state definitions may be associated with the same reference coordinate vector. However, once all posture states are defined, the system may update all of the posture states based on a difference between sensed posture data and a single posture state definition.

As described with respect to FIGS. 6A-6C, a posture state may be defined by a posture state reference coordinate vector and a tolerance, e.g., angle, cosine, or distance value. The reference coordinate vector and a tolerance for a posture state are examples of posture state reference data and a posture state definition. Each of these aspects may be parameters of a set of posture state definitions. Moreover, each of the parameters may be adjusted to calibrate the posture state module to the particular orientation of the sensors within the patient and/or typical patient postures. These postures may also change over time and require updating periodically. Programmer 20 may prompt the clinician to orient one or more sensors of posture state module 46 to establish values for one or more posture state reference coordinate vectors associated with posture state definitions. Once values for the posture state reference coordinate vectors associated with the posture state definitions have been established, posture state module 46 is enabled to classify the posture state of patient 12 according to the set of posture state definitions. In this manner, the only user input required to enable the set of posture state definitions for posture responsive therapy may be the indications received during the orientation procedure. The values for the posture state reference coordinate vectors established during the orientation process are input into the pre-established posture state definitions.

In addition, the methods for defining a posture state described with respect to FIGS. 6A-6C may include the ability to define activity or mobility in addition to the other stationary orientations of patient 12. A mobility posture state may be a specific posture state defined only on movement of patient 12 or a combination of movement and a stationary orientation of patient 12. For example, a mobility posture state may only be determined when the patient 12 is already detected within a standing or upright posture state. In this example, the set of posture state definitions may require that the standing or upright posture state is detected and motion of patient 12 is detected to exceed a mobility threshold, such as, e.g., a threshold representing a number of movements (such as walking or jogging steps) in a given time period. In other examples, a mobility posture state may be determined for any posture or orientation also detected when the activity or mobility of patient 12 is detected to exceed the mobility threshold.

Posture state module 46, or any other module tasked with detecting mobility, may use an algorithm to detect the mobility posture state (e.g., when a level of activity or motion has been detected). In some examples, this level may be defined by a mobility threshold that represents a magnitude and/or duration that activity was detected. For example, posture state module 46 may determine that the mobility threshold has been exceeded when a certain number of oscillations greater than a predetermined magnitude occur within a predetermined period of time. In other examples, the number of oscillations may need to exceed a predetermined magnitude and a predetermined frequency for a certain period of time. These algorithms may also be modified to incorporate rolling averages, moving windows of time, weighted average of magnitudes, or any other methods of determining when the motion of the patient should be considered to have exceeded the mobility threshold. In this manner, the mobility threshold may be a simple value or a complex sensitivity to detected motion that triggers determination of the mobility posture state.

Figure 7A:
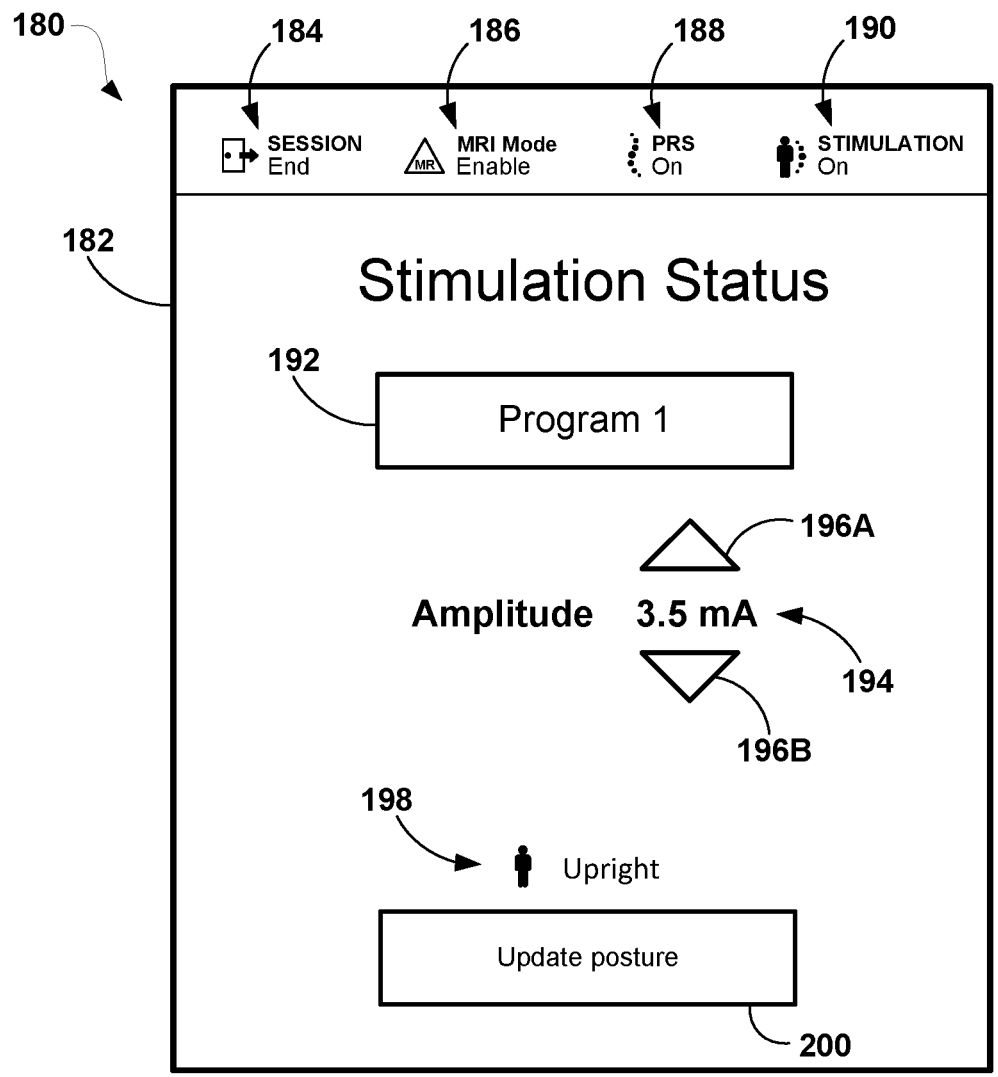
FIG. 7A is a conceptual diagram illustrating an example user interface of an external programmer for requesting an update to posture state definitions.

FIG. 7A is a conceptual diagram illustrating an example user interface 180 of an external programmer 20 for requesting an update to posture state definitions. User interface 180 may be an example of user interface 66 of programmer 20 in some examples. Although user interface 180 may typically be used for a patient programmer and used by a patient, user interface 180, alternatively or additionally, may be presented in a clinician programmer or remote device in other examples. Moreover, user interface 180 is generally described as being presented via a touchscreen device. However, one or more features of user interface 180 may be implemented with one or more inputs having switches, dials, slides, buttons, keypads, or any other mechanisms separate from a touchscreen display.

As shown in the example of FIG. 7A, user interface 66 of programmer 20 may provide example user interface 180 to the user, such as a clinician, via screen 182. User interface 180 may relate to a "Stimulation Status" screen that includes features for adjusting stimulation and/or updating the posture state definitions by IMD 14, for example. Screen 182 includes session end button 184, MRI Mode toggle 186, posture responsive therapy toggle 188, and stimulation therapy toggle 190. Screen 182 also includes program selection button 192, amplitude value indicator 194, amplitude adjustments 196A and 196B, posture state indicator 198, and update posture button 200.

Session end button 184 may, when selected by a user, end the session that the user can change stimulation parameters or update posture for IMD 14. MRI Mode toggle 186 switches the operating mode of IMD 14 between an enabled mode (e.g., safe for IMD 14 to be placed in an MRI device) and disabled mode (e.g., IMD 14 should not be placed within an MRI device). Posture responsive therapy toggle 188 switches between making the delivery of therapy responsive to detected posture states (e.g., PRS On) and making the delivery of therapy independent or not responsive to detected posture states. Stimulation therapy toggle 190 switches between instructing IMD 14 to deliver therapy to turning therapy off.

Program selection button 192 displays the current stimulation program used to deliver therapy. In the example of FIG. 7A, the currently active stimulation program is entitled "Program 1." In some examples, the user may select to have two or more programs active at the same time, either in a repeated cycle or running simultaneously such that pulses from each program are interleaved with each other (e.g., the patient may perceive both stimulation programs being delivered simultaneously). Program selection button 192 may be selectable such that, in response to being selected, user interface 180 may present a drop down menu or other list of available programs from which the user can select for subsequent therapy. Amplitude value indicator 194 indicates the current amplitude value of the delivered stimulation (shown as 3.5 mA). Amplitude adjustment 196A can be selected by the user to request that the system increases the current amplitude, and amplitude adjustment 196B can be selected by the user to request that the system decreases the current amplitude. Other stimulation parameters (e.g., pulse frequency, pulse width, electrode configuration, pulse shape, etc.) may be displayed and/or adjusted via user interface 180 in other examples.

Posture state indicator 198 provides a representation of the currently detected posture state of the patent. Posture state indicator 198 is shown to includes two different representations of the current posture, such as an icon (e.g., a graphical representation of the human posture) and text (e.g., a word that describes the detected posture). In the example of FIG. 7A, IMD 14 is detecting the upright posture. Update posture button 200 is selectable by the user in order to trigger the system to update, or recalibrate, the posture state definitions used to determine which posture state the patient is currently residing. In response to receiving user input selecting update posture button 200, the system may proceed to perform the process of updating the posture state definitions. In some examples, user interface 180 may remain on screen 182 and indicate when the process is complete. In other examples, user interface 180 will proceed to another screen that provides additional information associated with the update process, such as screen 202 as shown in FIG. 7B.

Figure 7B:
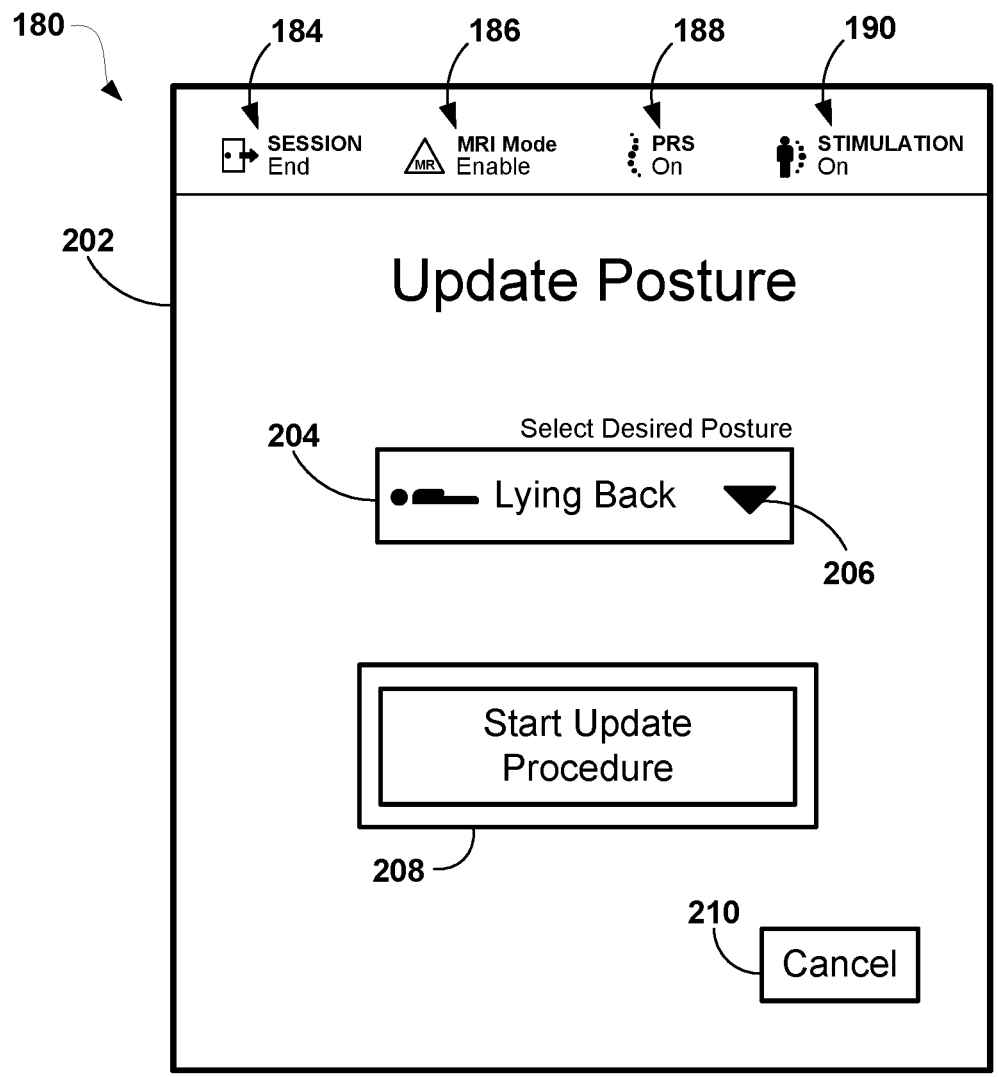
FIG. 7B is a conceptual diagram illustrating an example user interface of an external programmer for updating the posture state definitions.

FIG. 7B is a conceptual diagram illustrating example user interface 180 of FIG. 7A of external programmer 20 for updating the posture state definitions. As shown in FIG. 7B, screen 202 of user interface 180 includes information and selectable inputs associated with updating posture state definitions. Requested posture 204 provides an indication of the desired posture state that patient 12 will assume for comparison to the posture sensor data generated at that time. In some examples, the posture state shown in requested posture 204 is the same posture state that was previously detected when the update posture button 200 was selected. In other examples, the posture state of requested posture 204 may be selected because it facilitates the update process or otherwise is more stable for patient 12. If the user desires a different posture state to assume for the update procedure, selection arrow 206 may be selected to provide the different selectable posture states. In this manner, user interface 180 may provide a list of two or more selectable posture states that the user can select for updating the posture state definitions. User interface 180 will update the posture state shown in requested posture 204 to reflect the user selected posture state.

Once the user has assumed the posture state shown in requested posture 204 (e.g., lying back, or supine, as shown in FIG. 7B), the user can select start update procedure button 208. In response to receiving user selection of update posture button 200, the system may begin the process by obtaining posture sensor data representing the currently assumed posture state of the patient. The system may also determine the difference between the posture sensor data and the posture state definition for the assumed posture state and apply that difference to all of the posture data definitions that define the respective posture states assumable by the patient. In some examples, screen 202 may present a "hold posture" indication or some other notification while the process is performed so that the patient remains in the posture state. Upon the system completing the update process, the system may immediately return to screen 182 of FIG. 7A or first present a notification that the process is complete and request that the user navigate to the desired screen of user interface 180. At any time prior to or during the update process, the user may cancel the process by selecting cancel button 210. In response to receiving selection of cancel button 210, user interface 180 may return to screen 182, for example.

The example plurality of posture states may include at least one of an upright posture state, a lying back posture state, a lying front posture state, a lying right posture state, and a lying left posture state. In some examples, posture states may also include active or mobile posture state. Other posture states may be included or not included in this list. The mobile posture state may be a fully independent posture state. In other examples, the mobile posture state may be a combination of a stationary posture state or orientation of the patient and a detected activity or mobility level exceeding one or more thresholds. As discussed herein, the determination of posture states may be used by IMD 14 to provide posture responsive therapy. For example, programmer 20 may control IMD 14 to deliver posture responsive therapy to patient 14 based on the adjusted set of posture state definitions (e.g., programmer 20 may transmit updated posture state definitions to IMD 14 for use in delivering therapy).

Although screen 182 of user interface 180 indicates that the user may manually initiate the update posture state definition process, the system may automatically initiate the process. For example, the system may identify a trigger event and responsively present screen 202 for the user to complete the update posture process. In other examples, user interface 180 may present a pop-up window or other notification requesting that the user endure the update posture screen 202. The notification may have a selectable button that, in response to being selected, presents screen 202. There may be several different trigger events that, when detected by IMD 14, programmer 20, or some other component of the system, cause the system to request that the user completes the update posture process. Example trigger events may include a disagreement between the detected posture state and the activity level of the patient (e.g., the system detecting a lying on the side posture state and activity exceeding an activity threshold), patient adjustment of a stimulation parameter value at a frequency (or a threshold number of times within a predetermined period) greater than a threshold frequency (e.g., indicative of the patient manually adjusting therapy), or the system determining that posture responsive therapy is not working as desired (e.g., decreased activity of the patient indicating therapy is not reducing pain levels for the patient). In some examples, the system may request that the user perform the update posture process in response to a predetermined schedule (e.g., monthly or yearly). In other examples, in response to being powered on, programmer 20 may present the currently detected posture state and request that the user initiate the update posture process if the currently detected posture state is not accurate.

In some examples, the system may store previously used posture state definitions and date stamp those definitions so that the user can revert back to previous posture state definitions if the patient has problems updating the posture state definitions. For example, the user may request to go back to a specific time and use the posture state definitions at that time. In another example, the system may revert back to the posture state definitions originally defined during a clinician office visit or other known and approved posture state definitions. In some examples, the system may receive clinician requests to perform the update posture procedure remotely from a networked device. The clinician may be able to talk with the patient to confirm the assumed posture state and remotely control programmer 20 to perform the update posture procedure. In some examples, the clinician may be enabled to lock out the ability of the patient programmer to perform the update posture process to prevent a patient from performing the update posture procedure without supervision.

Figure 8:
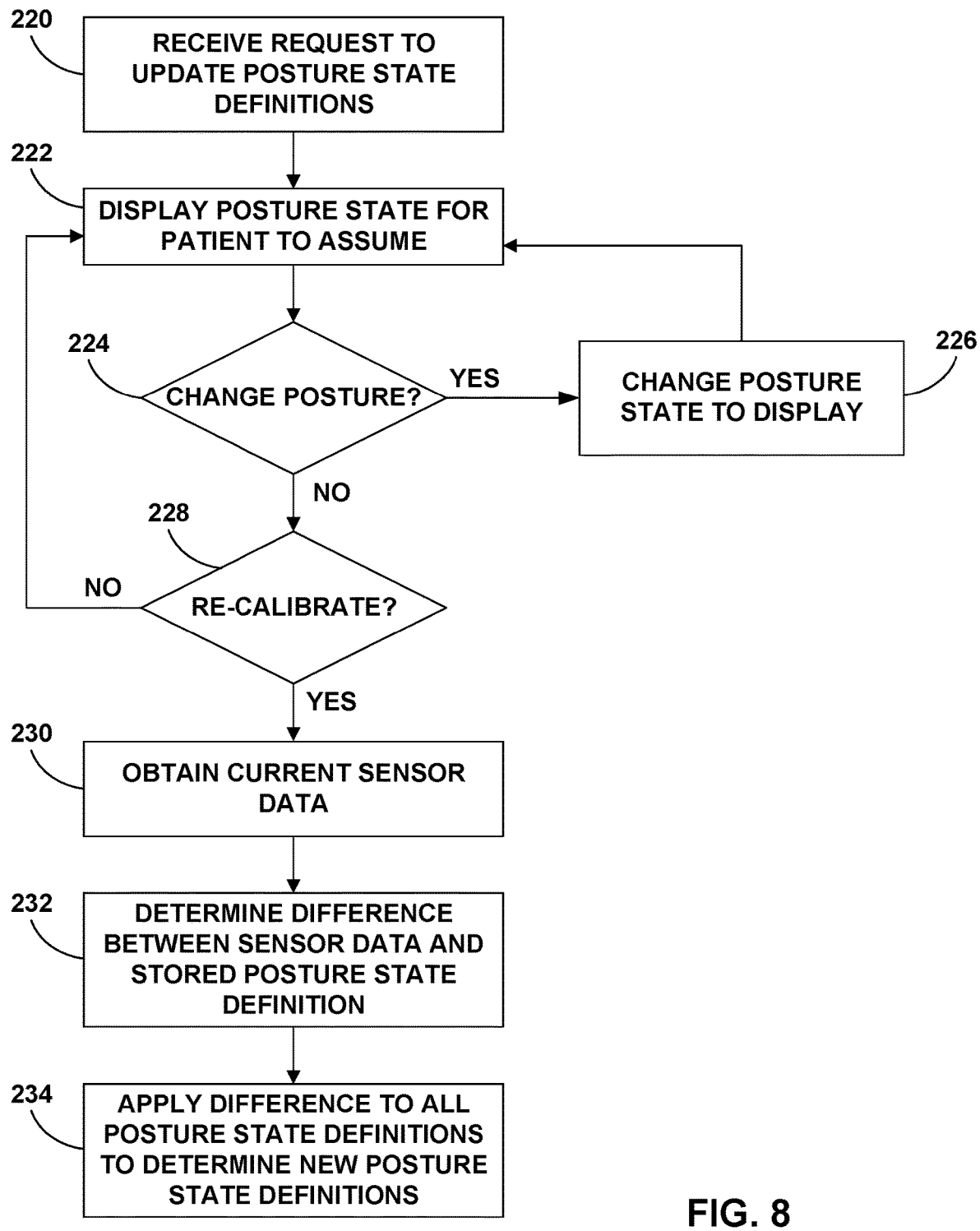
FIG. 8 is a flow diagram illustrating an example method for updating posture state definitions using a difference between sensed data and a single posture state definition.

FIG. 8 is a flow diagram illustrating an example method for updating posture state definitions using a difference between sensed data and a single posture state definition. The example of FIG. 8 will be described with respect to processing circuitry 64 of external programmer 20 and IMD 14. However, these processes may be at least partially completed by other devices such as processing circuitry 40 of IMD 14, server 82, and/or computing devices 84, in other examples.

As shown in the example of FIG. 8, processing circuitry 64 may receive, via user interface 66, a request from a user to update posture state definitions (220). Processing circuitry 64 then controls user interface 66 to display the posture state for the patient to assume (222). The initially displayed posture state may be the most recently detected posture state for the patient or a default posture state for the update process. If processing circuitry 64 receives a request to change the posture state ("YES" branch of block 224), processing circuitry 64 controls user interface 66 to change the posture state being displayed to correspond to the requested posture state input by the user (226). If processing circuitry 64 does not receive a request to change the posture state ("NO" branch of block 228), processing circuitry 64 checks to determine if a request to start the re-calibration procedure has been received, such as selection of start update procedure button 208 of FIG. 7B (228). If the request has not been received ("NO" branch of block 228), processing circuitry 64 continues to control user interface 66 to display the posture state to assume (222).

If processing circuitry 64 has received the request to start the update procedure ("YES" branch of block 228), processing circuitry 64 obtains the current sensor data from one or more posture sensors (230). Processing circuitry 64 can simply sample the output from the sensor data continually being provided to processing circuitry 64, or processing circuitry 64 can request that the posture sensor generate an output to be delivered to processing circuitry 64. Processing circuitry 64 the determines the difference between the generated sensor data received during the update process and the stored posture state definition for the posture state displayed by user interface 66 and assumed by the patient during the update process. The difference may be a differential vector between the received vector from the sensor data and the vector of the posture state definition, vector components representing the difference between the sensor data vector and the posture state definition vector, one or more angles (e.g., in a determined plane or in respective coordinate planes) representing the difference between the sensor data and the stored posture state definition, or any other transform function that represents a difference from the stored posture state definition to the current sensor data. Processing circuitry 64 then applies the difference to all of the posture state definitions to update all of the posture state definitions that define each posture state of the plurality of posture states (234). Processing circuitry 64 may then store the updated posture state definitions in memory for use in determining the posture state of the patient from subsequent posture sensor data.

Figure 9:
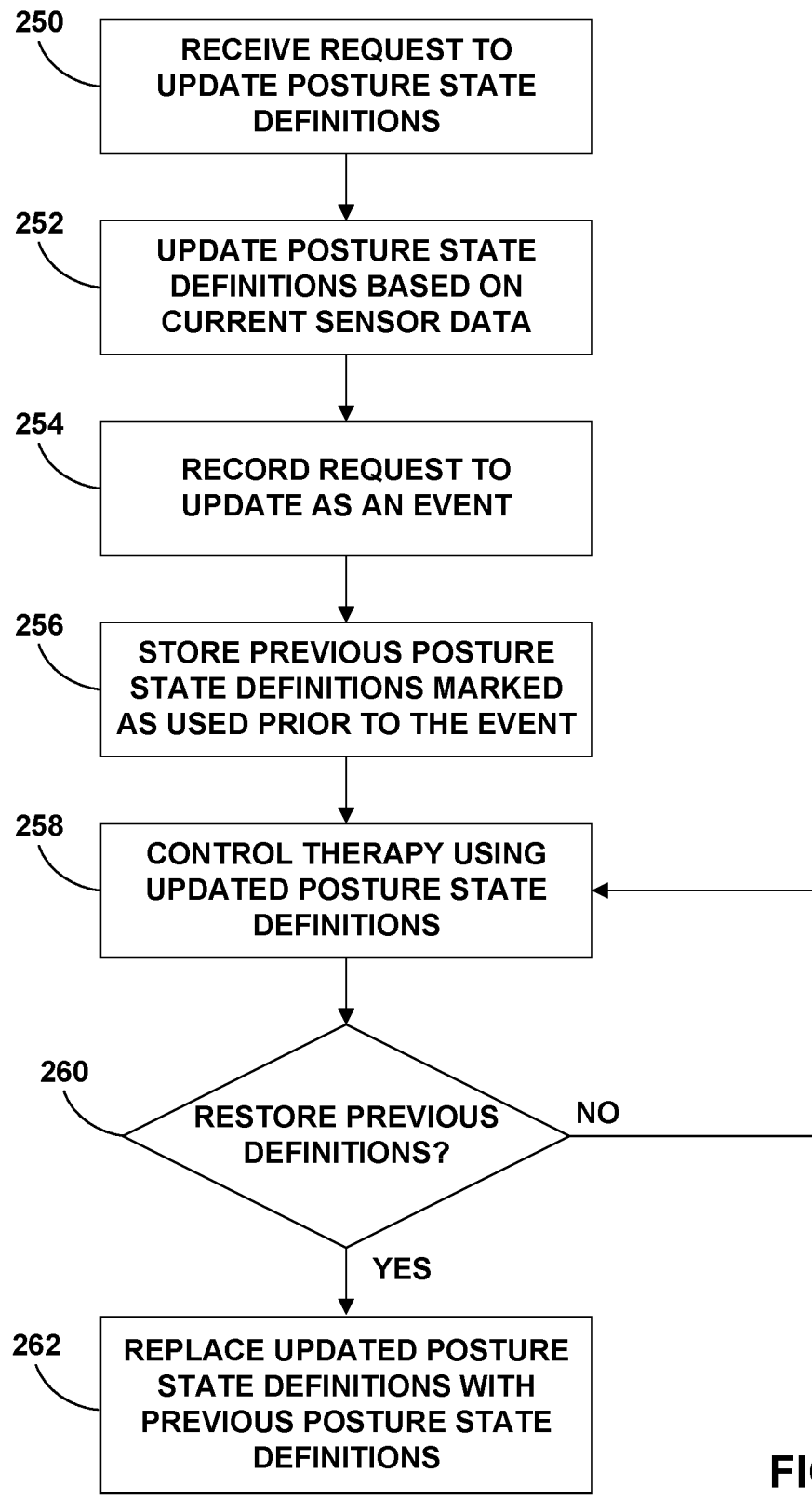
FIG. 9 is a flow diagram illustrating an example method for restoring previously used posture state definitions.

FIG. 9 is a flow diagram illustrating an example method for restoring previously used posture state definitions. The example of FIG. 9 will be described with respect to processing circuitry 64 of external programmer 20 and IMD 14. However, these processes may be at least partially completed by other devices such as processing circuitry 40 of IMD 14, server 82, and/or computing devices 84, in other examples.

As shown in the example of FIG. 9, processing circuitry 64 may receive, via user interface 66, a request from a user to update posture state definitions (250). Processing circuitry 64 then proceeds to update the posture state definitions based on the current posture sensor data, such as by the process described in FIG. 8 (252). Processing circuitry 64 then records the request to update the posture state definitions as an event (254) and stores the previous posture state definitions marked as used immediately prior to the event (256). In this manner, processing circuitry 64 has identified that period of time during which the previous posture state definitions were used by the system for possible reference at a later time. Processing circuitry 64 can then control therapy delivery using the updated posture state definitions (258).

As long as processing circuitry 64 does not receive a request to restore previous posture state definitions or update the posture state definitions again ("NO" branch of block 260), processing circuitry 64 continues to control therapy delivery using the updated posture state definitions (258). If processing circuitry 64 receives a command or request to use prior posture state definitions ("YES" branch of block 260), processing circuitry 64 will replace the updated posture state definitions with previous posture state definitions stored in memory (262). In some examples, processing circuitry 64 may implement the most recently used posture state definitions or posture state definitions associated with the last stored stable configuration (e.g., the posture state definitions determined at the most recent clinic session or the posture state definitions used for the most recent period of time that is longer than a predetermined threshold time). In other examples, the request to revert to previous posture state definitions may specify the time period for which the posture state definitions were used previously. For example, user interface 66 may present a list of available posture state definitions and/or a list of time periods for which prior posture state definitions are selectable. After processing circuitry 64 replaces the updated posture state definitions with the prior used posture state definitions, processing circuitry 64 may continue to determine the posture states of the patient based on output from the posture sensor and the posture state definition now being used.

The following are examples described herein. Example 1: A system includes a memory configured to store a plurality of posture state definitions defining a plurality of posture states; and processing circuitry configured to: receive a request to update the plurality of posture state definitions; responsive to receiving the request, obtain sensor data for one posture state of the plurality of posture states, the sensor data generated while a patient is in the one posture state; determine a difference between the sensor data and a posture state definition of the posture state definitions corresponding to the one posture state; update, based on the difference, the plurality of posture state definitions; and store the updated plurality of posture state definitions in the memory.

Example 2: The system of example 1, wherein the processing circuitry is configured to, responsive to receiving the request, output, via a user interface, a representation of the one posture state.

Example 3: The system of example 2, wherein the processing circuitry is configured to: receive a user input confirming the patient is in the one posture state; and responsive to receiving the user input, obtain the sensor data for the one posture state.

Example 4: The system of any of examples 1 through 3, wherein the processing circuitry is configured to receive, via a user interface, a user selection of the one posture state from at least a subset of the plurality of posture states.

Example 5: The system of any of examples 1 through 4, further comprising a user interface configured to receive the request to update the plurality of posture state definitions.

Example 6: The system of any of examples 1 through 5, wherein the request comprises a trigger event, and wherein the processing circuitry is configured to: determine that a sensed posture state does not correspond to detected patient activity; responsive to determining that the sensed posture state does not correspond to the detected patient activity, automatically generate the trigger event.

Example 7: The system of any of examples 1 through 6, further comprising a posture sensor configured to generate the sensor data while the patient is in the one posture state.

Example 8: The system of any of examples 1 through 7, wherein the processing circuitry is configured to: determine a first vector from the sensor data; determine a second vector for the posture state definition corresponding to the one posture state; determine the difference between by the sensor data and the posture state definition by determining the difference between the first vector and the second vector; and update the plurality of posture state definitions by subtracting the difference from a respective vector for each posture state definition of the plurality of posture state definitions.

Example 9: The system of any of examples 1 through 8, further includes an external programmer comprising the processing circuitry; and an implantable medical device configured to deliver electrical stimulation therapy according to a sensed posture state identified based on the updated plurality of posture state definitions.

Example 10: The system of any of examples 1 through 9, further comprising an implantable medical device comprising the processing circuitry.

Example 11: A method includes receiving, by processing circuitry, a request to update a plurality of posture state definitions, the plurality of posture state definitions defining a plurality of posture states and stored in a memory; responsive to receiving the request, obtaining, by the processing circuitry, sensor data for one posture state of the plurality of posture states, the sensor data generated while a patient is in the one posture state; determining, by the processing circuitry, a difference between the sensor data and a posture state definition of the posture state definitions corresponding to the one posture state; updating, by the processing circuitry and based on the difference, the plurality of posture state definitions; and storing, by the processing circuitry, the updated plurality of posture state definitions in a memory.

Example 12: The method of example 11, further comprising to, responsive to receiving the request, outputting, via a user interface, a representation of the one posture state.

Example 13: The method of example 12, further comprising receiving a user input confirming the patient is in the one posture state, and wherein obtaining the sensor data comprises, responsive to receiving the user input, obtaining the sensor data for the one posture state.

Example 14: The method of any of examples 11 through 13, further comprising receiving, via a user interface, a user selection of the one posture state from at least a subset of the plurality of posture states.

Example 15: The method of any of examples 11 through 14, wherein receiving the request to update the plurality of posture state definitions comprises receiving, via a user interface, the request to update the plurality of posture state definitions.

Example 16: The method of any of examples 11 through 15, wherein the request comprises a trigger event, and wherein the method further comprises: determining that a sensed posture state does not correspond to detected patient activity; and responsive to determining that the sensed posture state does not correspond to the detected patient activity, automatically generating the trigger event.

Example 17: The method of any of examples 11 through 16, wherein generating the sensor data comprises generating, by a posture sensor, the sensor data while the patient is in the one posture state.

Example 18: The method of any of examples 11 through 17, further includes determining a first vector from the sensor data; and determining a second vector for the posture state definition corresponding to the one posture state, wherein: determining the difference between by the sensor data and the posture state definition comprises determining the difference between the first vector and the second vector, and updating the plurality of posture state definitions comprises subtracting the difference from a respective vector for each posture state definition of the plurality of posture state definitions.

Example 19: The method of any of examples 11 through 18, wherein an external programmer comprises the processing circuitry, and wherein the method further comprises delivering, by an implantable medical device, the electrical stimulation therapy according to a sensed posture state identified based on the updated plurality of posture state definitions.

Example 20: A non-transitory computer-readable medium includes receive a request to update the plurality of posture state definitions, the plurality of posture state definitions defining a plurality of posture states and stored in a memory; responsive to receiving the request, obtain sensor data for one posture state of the plurality of posture states, the sensor data generated while a patient is in the one posture state; determine a difference between the sensor data and a posture state definition of the posture state definitions corresponding to the one posture state; update, based on the difference, the plurality of posture state definitions; and store the updated plurality of posture state definitions in the memory.

It should be noted that system 10 or other systems and devices described herein may not be limited to treatment or monitoring of a human patient. In alternative examples, system 10 may be implemented in non-human patients, e.g., primates, canines, equines, pigs, and felines. These other animals may undergo clinical or research therapies that may benefit from the subject matter of this disclosure.

The techniques of this disclosure may be implemented in a wide variety of computing devices, medical devices, or any combination thereof. Any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The disclosure contemplates computer-readable storage media comprising instructions to cause a processor to perform any of the functions and techniques described herein. The computer-readable storage media may take the example form of any volatile, non-volatile, magnetic, optical, or electrical media, such as a RAM, ROM, NVRAM, EEPROM, or flash memory that is tangible. The computer-readable storage media may be referred to as non-transitory. A server, client computing device, or any other computing device may also contain a more portable removable memory type to enable easy data transfer or offline data analysis.

The techniques described in this disclosure, including those attributed to various constituent components, may be implemented, at least in part, in hardware, software, firmware or any combination thereof. For example, various aspects of the techniques may be implemented within one or more processors, including one or more microprocessors, DSPs, ASICs, FPGAs, or any other equivalent integrated or discrete logic circuitry, as well as any combinations of such components, remote servers, remote client devices, or other devices. The term "processor" or "processing circuitry" may generally refer to any of the foregoing logic circuitry, alone or in combination with other logic circuitry, or any other equivalent circuitry.

Such hardware, software, firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Example computer-readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or any other computer readable storage devices or tangible computer readable media. The computer-readable storage medium may also be referred to as storage devices.

In some examples, a computer-readable storage medium comprises non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described herein. Any combination of the described operations or functions is contemplated. These and other examples are within the scope of the following claims.

What is claimed is:

1. A system comprising:
   a memory configured to store a plurality of posture state definitions defining a plurality of posture states; and
   processing circuitry configured to:
   receive a request to update the plurality of posture state definitions, wherein the request comprises a trigger event that identifies at least one of: a disagreement between a detected posture state and a detected patient activity, a patient adjustment of a stimulation parameter at a frequency greater than a threshold frequency, a patient adjustment of a stimulation parameter exceeding a threshold number of adjustments within a predetermined period, or posture responsive therapy having reduced therapeutic efficiency;
   responsive to receiving the request, obtain sensor data for a single posture state of the plurality of posture states, the sensor data generated while the patient is in the single posture state;
   calculate a difference between the sensor data and the single posture state definition of the posture state definitions corresponding to the single posture state;
   update, using the difference between the sensor data and the single posture state definition, all posture state definitions of the plurality of posture state definitions that define respective posture states of the plurality of posture states; and
   store the updated plurality of posture state definitions in the memory; and
   control, based on a sensed posture state identified according to the updated plurality of posture state definitions, an implantable medical device to deliver electrical stimulation therapy.

2. The system of claim 1, wherein the processing circuitry is configured to, responsive to receiving the request, output, via a user interface, a representation of the single posture state.

3. The system of claim 2, wherein the processing circuitry is configured to:
   receive a user input confirming the patient is in the single posture state; and
   responsive to receiving the user input, obtain the sensor data for the single posture state.

4. The system of claim 1, wherein the processing circuitry is configured to receive, via a user interface, a user selection of the single posture state from at least a subset of the plurality of posture states.

5. The system of claim 1, further comprising a user interface configured to receive a confirmation of the request to update the plurality of posture state definitions.

6. The system of claim 1, wherein the trigger event comprises the disagreement between the detected posture state and the detected patient activity, and wherein the processing circuitry is configured to generate the request by at least:
   determining that the detected posture state does not correspond to the detected patient activity; and
   responsive to determining that the detected posture state does not correspond to the detected patient activity, automatically generating the trigger event as the request.

7. The system of claim 1, further comprising a posture sensor configured to generate the sensor data while the patient is in the single posture state.

8. The system of claim 1, wherein the processing circuitry is configured to:
   determine a first vector from the sensor data;
   determine a second vector for the single posture state definition corresponding to the single posture state;
   calculate the difference between by the sensor data and the single posture state definition by calculating the difference between the first vector and the second vector; and
   update all of the posture state definitions of the plurality of posture state definitions by subtracting the difference from a respective vector for each posture state definition of the plurality of posture state definitions.

9. The system of claim 1, further comprising:
   an external programmer comprising the processing circuitry; and
   the implantable medical device configured to deliver the electrical stimulation therapy according to the sensed posture state identified based on the updated plurality of posture state definitions.

10. The system of claim 1, further comprising the implantable medical device comprising the processing circuitry.

11. The system of claim 1, wherein the processing circuitry is configured to:
    determine a transform function that represents the difference between the sensor data and the posture state definition of the posture state definitions corresponding to the single posture state; and
    update all posture state definitions according to the transform function.

12. A method comprising:
    receiving, by processing circuitry, a request to update a plurality of posture state definitions, the plurality of posture state definitions defining a plurality of posture states and stored in a memory, wherein the request comprises a trigger event that identifies at least one of: a disagreement between a detected posture state and a detected patient activity, a patient adjustment of a stimulation parameter at a frequency greater than a threshold frequency, a patient adjustment of a stimulation parameter exceeding a threshold number of adjustments within a predetermined period, or posture responsive therapy having reduced therapeutic efficiency;
    responsive to receiving the request, obtaining, by the processing circuitry, sensor data for a single posture state of the plurality of posture states, the sensor data generated while a patient is in the single posture state;
    calculating, by the processing circuitry, a difference between the sensor data and the single posture state definition of the posture state definitions corresponding to the single posture state;
    updating, by the processing circuitry and using the difference between the sensor data and the single posture state definition, all posture state definitions of the plurality of posture state definitions that define respective posture states of the plurality of posture states;
    storing, by the processing circuitry, the updated plurality of posture state definitions in a memory; and
    controlling, based on a sensed posture state identified according to the updated plurality of posture state definitions, an implantable medical device to deliver electrical stimulation therapy.

13. The method of claim 12, further comprising to, responsive to receiving the request, outputting, via a user interface, a representation of the single posture state.

14. The method of claim 13, further comprising receiving a user input confirming the patient is in the single posture state, and wherein obtaining the sensor data comprises, responsive to receiving the user input, obtaining the sensor data for the single posture state.

15. The method of claim 12, further comprising receiving, via a user interface, a user selection of the single posture state from at least a subset of the plurality of posture states.

16. The method of claim 12, wherein receiving the request to update the plurality of posture state definitions comprises receiving, via a user interface, a confirmation of the request to update the plurality of posture state definitions.

17. The method of claim 12, wherein the trigger event comprises the disagreement between the detected posture state and the detected patient activity, and wherein the method further comprises:
    determining that the detected posture state does not correspond to the detected patient activity; and
    responsive to determining that the detected posture state does not correspond to the detected patient activity, automatically generating the trigger event as the request.

18. The method of claim 12, wherein generating the sensor data comprises generating, by a posture sensor, the sensor data while the patient is in the single posture state.

19. The method of claim 12, further comprising:
    determining a first vector from the sensor data; and
    determining a second vector for the single posture state definition corresponding to the single posture state, wherein:
    calculating the difference between by the sensor data and the single posture state definition comprises calculating the difference between the first vector and the second vector, and
    updating all of the posture state definitions of the plurality of posture state definitions comprises subtracting the difference from a respective vector for each posture state definition of the plurality of posture state definitions.

20. The method of claim 12, wherein an external programmer comprises the processing circuitry, and wherein the method further comprises delivering, by the implantable medical device, the electrical stimulation therapy according to the sensed posture state identified based on the updated plurality of posture state definitions.

21. A non-transitory computer-readable medium comprising instructions that, when executed, cause processing circuitry to:
- receive a request to update the plurality of posture state definitions, the plurality of posture state definitions defining a plurality of posture states and stored in a memory, wherein the request comprises a trigger event that identifies at least one of: a disagreement between a detected posture state and a detected patient activity, a patient adjustment of a stimulation parameter at a frequency greater than a threshold frequency, a patient adjustment of a stimulation parameter exceeding a threshold number of adjustments within a predetermined period, or posture responsive therapy having reduced therapeutic efficiency;
- responsive to receiving the request, obtain sensor data for a single posture state of the plurality of posture states, the sensor data generated while a patient is in the single posture state;
- calculate a difference between the sensor data and the single posture state definition of the posture state definitions corresponding to the single posture state;
- update, using the difference between the sensor data and the single posture state definition, all posture state definitions of the plurality of posture state definitions that define respective posture states of the plurality of posture states;
- store the updated plurality of posture state definitions in the memory; and
- control, based on a sensed posture state identified according to the updated plurality of posture state definitions, an implantable medical device to deliver electrical stimulation therapy.

* * * * *